(12) United States Patent
Huang et al.

(10) Patent No.: US 6,751,666 B1
(45) Date of Patent: Jun. 15, 2004

(54) RIPPLE SCHEDULING FOR END-TO-END GLOBAL RESOURCE MANAGEMENT

(75) Inventors: Jiandong Huang, Plymouth, MN (US); Yuewei Wang, Campbell, CA (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/310,798

(22) Filed: May 12, 1999

Related U.S. Application Data

(62) Division of application No. 08/827,536, filed on Mar. 28, 1997.

(51) Int. Cl.[7] .............................................. G06F 15/173
(52) U.S. Cl. ........................................ 709/226; 705/8
(58) Field of Search ................................. 709/227, 203, 709/219, 264, 222, 223–226, 228, 604; 370/17, 54, 410, 230, 232, 235, 260, 395, 352, 257, 419, 440, 432, 412; 705/8; 707/7, 14, 10, 4; 395/653; 364/514; 379/230; 348/7; 710/36; 714/57

(56) References Cited

U.S. PATENT DOCUMENTS

| | | | |
|---|---|---|---|
| 4,776,005 A | * 10/1988 | Petriccione et al. | 379/142 |
| 4,914,571 A | 4/1990 | Baratz et al. | 364/200 |
| 5,241,668 A | 8/1993 | Eastridge et al. | 395/575 |
| 5,363,121 A | * 11/1994 | Freund | 709/101 |
| 5,446,730 A | * 8/1995 | Lee et al. | 370/54 |
| 5,457,680 A | * 10/1995 | Kamm et al. | 370/17 |
| 5,459,871 A | 10/1995 | Van Den Berg | 395/650 |
| 5,461,611 A | * 10/1995 | Drake, Jr. et al. | 370/54 |
| 5,506,847 A | 4/1996 | Shobatake | 370/94.3 |
| 5,519,689 A | * 5/1996 | Kim | 370/17 |
| 5,530,695 A | * 6/1996 | Dighe et al. | 370/17 |
| 5,627,978 A | 5/1997 | Altom et al. | 395/330 |
| 5,644,715 A | * 7/1997 | Baugher | 709/204 |
| 5,646,676 A | * 7/1997 | Dewkett et al. | 348/7 |
| 5,671,225 A | 9/1997 | Hooper et al. | 370/468 |

(List continued on next page.)

OTHER PUBLICATIONS

The QoS Broker—Nahrstedt, Smith (1995) ; cairo.cs.uiuc.edu/papers/QoSbroker.ps.*
The Design of a QoS Controlled ATM Based . . . —Coulson . . . (1994); www.ctr.columbia.ed/~campbell/andrew/publications/papers/MPG–94–05.ps.gz.*
Network Service Customization: End–Point Perspective—Nahrstedt (1993) ; www.cis.upenn.edu/~dsl/read_reports/TR–93–100.ps.Z.*
End–Point Resource Admission Control for Remote Control . . . —Nahrstedt, Smith (1995); www.cis.upenn.edu/~dsl/read_reports/Admission.ps.Z.*
Global Reource management References.www.erg.sri.com/projects/grm/private/references.html.*

(List continued on next page.)

Primary Examiner—Jack B. Harvey
Assistant Examiner—Thong Vu

(57) ABSTRACT

A global resource manager is provided for each node of a plurality of nodes of a distributed data processing system. Each node can be a coordinator node, an intermediate node, and a leaf node depending on the node at which a session arrives for global processing. In response to the arriving sessions, the global resource managers implement ripple scheduling by conducting a global QoS negotiation and adaptation, and preemption if necessary, in order to determine if the arriving session is supportable by the distributed data processing system. More specifically, the resource managers of all nodes determine whether their corresponding nodes can support the arriving session. The resource managers of the coordinator node and all intermediate nodes request their child nodes to indicate whether the child nodes can support the arriving session. The resource managers of all intermediate nodes and all leaf nodes respond to their coordinating or intermediate nodes with an indication of supportability. The resource manager of the coordinator node sends a commit message if all nodes can support the arriving session.

25 Claims, 26 Drawing Sheets

U.S. PATENT DOCUMENTS

| | | | | |
|---|---|---|---|---|
| 5,675,743 A | | 10/1997 | Mavity | 395/200.15 |
| 5,691,975 A | * | 11/1997 | Hamada et al. | 370/232 |
| 5,719,786 A | * | 2/1998 | Nelson et al. | 364/514 |
| 5,732,078 A | | 3/1998 | Arango | 370/355 |
| 5,734,652 A | | 3/1998 | Kwok | 370/395 |
| 5,742,772 A | * | 4/1998 | Screenan | 709/226 |
| 5,751,956 A | * | 5/1998 | Kirsch | 709/203 |
| 5,757,771 A | * | 5/1998 | Li et al. | 370/235 |
| 5,761,505 A | * | 6/1998 | Golson et al. | 395/653 |
| 5,809,501 A | * | 9/1998 | Noven | 707/7 |
| 5,826,239 A | * | 10/1998 | Du et al. | 705/8 |
| 5,835,491 A | | 11/1998 | Davis et al. | 370/386 |
| 5,835,724 A | * | 11/1998 | Smith | 709/227 |
| 5,838,921 A | * | 11/1998 | Speeter | 709/227 |
| 5,841,980 A | * | 11/1998 | Waters et al. | 709/204 |
| 5,842,043 A | * | 11/1998 | Nishimura | 710/36 |
| 5,867,653 A | | 2/1999 | Aras et al. | 395/200.34 |
| 5,878,056 A | | 3/1999 | Black et al. | 371/32 |
| 5,878,128 A | * | 3/1999 | Kantola | 379/230 |
| 5,881,049 A | * | 3/1999 | Beshai et al. | 370/230 |
| 5,886,980 A | * | 3/1999 | Zheng | 370/230 |
| 5,898,668 A | * | 4/1999 | Shaffer | 370/230 |
| 5,933,412 A | | 8/1999 | Choudhury et al. | 370/218 |
| 5,974,045 A | * | 10/1999 | Ohkura et al. | 370/395 |
| 6,016,319 A | * | 1/2000 | Kshirsagar et al. | 370/410 |
| 6,075,770 A | * | 6/2000 | Chang et al. | 370/230 |
| 6,081,513 A | * | 6/2000 | Roy | 370/260 |
| 6,122,759 A | * | 9/2000 | Ayanoglu et al. | 714/57 |

OTHER PUBLICATIONS

Huang et al., "Integrated System Support for Continuous Multimedia Applications," *Proceedings of the International Conference on Distributed Multimedia Systems and Applications*, Hawaii, (Aug. 1994).

Huang et al., "Resource Management for Continuous Multimedia Database Applications," *Proceedings of the 15th IEEE Real–Time Systems Symposium*, Puerto Rico, (Dec. 1994).

Huang, et al., "Presto–A Multimedia Data Managment System for Mission–Critical Applications," *Final Technical Report RL–TR–96–0183*, Air Force Rome Laboratory, 525 Brooks Road, Griffiss AFB, NY 13441, (Aug. 1996).

Huang, et al., "A Decentralized End–to–End Scheduling Approach for Continous Multimedia Applications," *Proceedings of the 6th International Workshoop on Network and Operating System for Digital Audio and Video*, Japan (Apr.).

Huang, et al., "Presto–A System Environment for Mission–Critical Multimedia Applications," *Proceeding of the Sixth Annual IEEE Dual–Use Technologies and Applications Conference*, (Jun. 1996).

Huang, "System Resource Managment for Mission–Critical Multimedia Applications," Computer Science Colloquia, University of Minnesota, pp. 1–35, (Oct. 28, 1996).

Huang, "Tutorial: Real–Time Scheduling Technology for Continous Multimedia Applications," *Lecture Notes of the 3rd ACM Multimedia Conference*, San Francisco, (Nov. 1995).

Huang, et al., "On Supporting Mission–Critical Multimedia Applications," *Proceedings of the Third IEEE International Conference on Multimedia Computing and Systems*, Japan, (Jun. 1996).

Cota–Robles, et al., "Schedulability Analysis for Desktop Multimedia Applications: Simple Ways to Handle General–Purpose Operating Systems and Open Environments," pp. 475–483, IEEE (1997).

Anderson, et al., "Support For Continuous Media In the Dash System," pp. 54–61, IEEE (Jul. 1990).

* cited by examiner

|  | | SESSION Si | | |
|---|---|---|---|---|
|  | | SHRINK QoS | MODE CHANGE PREEMPT | EXECUTE |
| SESSION Sj | SHRINK QoS | NOT ALLOWED | NOT ALLOWED | LOCK Si |
| | MODE-CHANGE PREEMPT | NOT ALLOWED | NOT ALLOWED | LOCK Si |
| | EXECUTE | LOCK Sj | LOCK Sj | NO CONFLICT |

FIG.8

RIPPLE SCHEDULING FOR END-TO-END GLOBAL RESOURCE MANAGEMENT

This is a Divisional of U.S. application Ser. No. 08/827,536, filed Mar. 28, 1997.

RELATED APPLICATIONS

The present invention is related to the invention disclosed in U.S. patent application Ser. No. 08/828,314 filed Mar. 28, 1997.

TECHNICAL FIELD OF THE INVENTION

The present invention is directed to global resource management of distributed data processing systems.

BACKGROUND OF THE INVENTION

Continuous multimedia applications are being developed for entertainment (e.g., video-on-demand services), for office automation (e.g., video conferencing), for crisis management, for command and control, and the like. In these continuous multimedia applications, video, audio, and/or image streams are processed within a node and between nodes of a data processing system.

Some continuous multimedia applications are mission critical and some are not. For example, the continuous multimedia applications being developed for entertainment (e.g., video-on-demand services), for office automation (e.g., video conferencing), and the like, are not particularly mission-critical. By contrast, the continuous multimedia applications being developed for crisis management, for command and control, and the like, are often mission critical. Mission-critical continuous multimedia applications are becoming increasingly important.

Mission-critical continuous multimedia applications have at least three unique characteristics—they are criticality driven, they are dynamic, and they operate in real time. With respect to the first of these unique characteristics, media streams in mission-critical continuous multimedia applications may be associated with an attribute of criticality. Criticality is an indication of the importance of a particular application being executed at a given time, and is assigned to the application by a system administrator (or mediator) who reviews all applications to determine the criticality differences between them. For instance, an application which is performing periodic image-capturing and flaw detection in a process control can be more important than an application that monitors floor activities in a controlled plant. Consequently, the periodic image-capturing and flaw detection stream is assigned a higher criticality level by the system administrator than is the video stream relating to the monitored floor activities. In order to support different criticality levels, the data processing system which processes such media streams must be criticality cognitive and must be able to support plural critical multimedia data streams in the presence of multiple service requests.

With respect to the second of these unique characteristics, mission-critical continuous multimedia applications are often dynamic and may vary greatly in their demands on the local resources of the data processing system. In digital battlefield management, for example, detection of a mobile target may trigger a sequence of reactions, such as video monitoring, infrared tracking, image library retrieval for target matching and recognition, media data fusion and filtering, and command and control. Such dynamic demands on the local resources of the data processing system are not predictable a priori, and, therefore, require applications to negotiate on line for, and adapt to, the available local resources, which may include disk i/o bandwidth, CPU cycles, memory space, video compression/decompression capacity, network bandwidth, and the like. Without sufficient resources and proper resource management, multimedia streams may lose their data or timeliness in a random fashion, causing application malfunction.

With respect to the third of these unique characteristics, mission-critical continuous multimedia applications must operate according to a guaranteed latency and data flow rate. Latency is the end-to-end delay from the time when the very first media unit is produced at a stream source to the time it reaches a stream destination. Rate is the number of media data units per second that are processed by a processing node.

Moreover, when execution of an application requires resources of more than one node of a distributed data processing system, the execution of the application by those nodes must be coordinated. Otherwise, execution of the application may fail because one of the nodes, which is to participate in the execution of the application but which does not have the resources allocated for the application, may undermine the execution devoted by the other nodes. This problem becomes increasingly severe as the number of applications to be concurrently executed across the distributed data processing system increases.

The present invention is directed to a global resource management arrangement that coordinates demands on resources of a distributed data processing system in a deterministic, adaptive manner (according to, for example, an application's QoS, timing, and criticality requirements).

SUMMARY OF THE INVENTION

According to one aspect of the present invention, a resource manager for each node of a plurality of nodes of a distributed data processing system comprises determining means, request sending means, response sending means, and commit sending means. Each node may receive an arriving session to process. The determining means determines whether a node corresponding to the determining means can support the arriving session. The request sending means sends, if the corresponding node is a coordinator node or an intermediate node, a support request to child nodes which are to process the arriving session. The response sending means sends, if the corresponding node is an intermediate node or a leaf node, a response to a parent node. The response indicates whether the arriving session can be supported. The commit sending means sends, if the corresponding node is a coordinator node and if the arriving session can be supported by the nodes which are to process the arriving session, a commit message to the child nodes which are to process the arriving session.

According to another aspect of the present invention, a resource manager for each node of a plurality of nodes of a distributed data processing system comprises determining means, request sending means intermediate response sending means, leaf response sending means, and commit sending means. Each node may receive an arriving session to process. The determining means determines whether a node corresponding to the determining means can support the arriving session. The request sending means sends, if the corresponding node is a coordinator node or an intermediate node and if the corresponding node can support the arriving session, a support request to child nodes which are to process the arriving session. The intermediate response sending means sends, if the corresponding node is an intermediate node, a YES response to a parent node if the corresponding node and its child nodes can support the arriving session and a NO response to the parent node if the corresponding node or at least one of its child nodes cannot support the arriving session. The leaf response sending means sends, if the corresponding node is a leaf node, a YES response to a parent node if the corresponding, node can support the arriving session and a NO response to the parent node if the corresponding node cannot support the arriving session. The commit sending means sends, if the corresponding node is a coordinator node and if the arriving session can be supported by the nodes which are to process the arriving session, a commit message to the child nodes which are to process the arriving session.

According to yet another aspect of the present invention, a resource manager for a coordinator node of a distributed data processing system comprises determining means, request sending means, and commit sending means. The coordinator node may receive an arriving session to process. The determining means determines whether the coordinator node can support the arriving session. The request sending means sends, if the determining means determines that the, coordinator node can support the arriving session, a support request to child nodes which are to process the arriving session. The commit sending means sends, if the coordinator node and all of the child nodes can support the arriving session, a commit message to the child nodes. The commit message includes a globally supportable QoS for the arriving session.

According to still another aspect of the present invention, a resource manager for an intermediate node of a distributed data processing system comprises determining means, request passing means, and response sending means. The intermediate node may be requested to process an arriving session. The determining means determines whether the intermediate node can support the arriving session. The request passing means passes, if the intermediate node can support the arriving session, a request from an upstream node to downstream nodes which are to process the arriving session. The request requests the downstream nodes to determine supportability of the arriving session. The response sending means sends a response to the request from the upstream node. The response sending means sends the response to the upstream node, the response is a YES response if the intermediate node and the downstream nodes can support the arriving session, and the response is a NO response if the intermediate node or one of the downstream nodes cannot support the arriving session.

According to a further aspect of the present invention, a resource manager for a leaf node of a distributed data processing system comprises determining means and response sending means. The leaf node may be requested to process an arriving session. The determining means determines whether the leaf node can support the arriving session. The response sending means sends a response to a request from an upstream node. The request asks whether the leaf node can support the arriving session, the response sending means sends the response to the upstream node, the response is a YES response if the leaf node can support the arriving session, and the response is a NO response if the leaf node cannot support the arriving session.

According to a yet further aspect of the present invention, a method is performed by a processing node of a distributed data processing system. The processing node may receive an arriving session and processes an other session. The method comprises the following steps: a) determining whether the arriving session can be supported; b) if the processing node is a coordinator node or an intermediate node, sending a request to downstream nodes, wherein the request asks whether the downstream nodes can support the arriving session; c) if the processing node is an intermediate node, sending a response to an upstream node in response to the request, wherein the response is a YES response if the processing node and the downstream nodes can support the arriving session, and wherein the response is a NO response if the processing node or one of the downstream nodes cannot support the arriving session; d) if the processing node is a leaf node, sending a response to an upstream node in response to the request, wherein the response is a YES response if the processing node can support the arriving session, and wherein the response is a NO response if the processing node cannot support the arriving session; e) if the processing node is a coordinator node and if the processing node and all of the downstream nodes can support the arriving session, sending a commit message to the downstream nodes which are to process the arriving session; and f) if the processing node is a coordinator node and if the processing node or one of the downstream nodes cannot support the arriving session, sending an abort message to the downstream nodes.

According to a still further aspect of the present invention, a global resource manager communicates locally with a local resource manager that locally manages a session. The global resource manager also communicates globally in order to globally manage the session. The global resource manager globally manages the session according to a criticality level, a timing requirement, and a QoS of the session.

According to another aspect of the present invention, a method, implemented provided to a user, globally manages a session. The session has a criticality level, a timing requirement, and a QoS associated therewith. The method comprising the following steps: a) enabling the user to make an initial adjustment of at least one of the criticality level, the timing requirement, and the QoS for the session; and b) enabling the user to make a subsequent adjustment of at least one of the criticality level, the timing requirement, and the QoS for the session, wherein the subsequent adjustment is made after partial execution of the session.

According to yet another aspect of the present invention, a method to globally manage a session in first and second phases comprises the following steps: a) negotiating among first and second nodes for a QoS of the session during the first phase by ripple scheduling the session; b) if the first and second nodes can execute the session, sending a commit message during the second phase from the first node to the second node; and c) if the first and second node cannot execute the session, sending an abort message during the second phase from the first node to the second node.

According to still another aspect of the present invention, a processing node of a distributed data processing system comprises a local resource manager and a global resource manager. The local resource manager is arranged to manage a local resource in response to a test-and-hold instruction. The global resource manager is arranged to conduct a peer-to-peer global QoS negotiation and adaptation with other global resource managers of the distributed data processing system a test-and-hold instruction, the global resource manager is arranged to initiated a test-and-hold instruction to the local resource manager, the global resource manager is arranged to receive a response from the local resource manager indicating whether its corresponding local resource can support a session, and the global resource manager is arranged to interface with different types of local resource managers.

According to a further aspect of the present invention, a processing node of a distributed data processing system comprises a local resource manager, an operating system, and a global resource manager. The local resource manager is arranged to manage a local resource in response to a test-and-hold instruction. The operating system is arranged to operate the local resource. The global resource manager is arranged to conduct a peer-to-peer global negotiation with other global resource managers of the distributed data processing system through a test-and-hold instruction, the global resource manager is arranged to initiate a test-and-hold-instruction to the local resource managers the global resource manager is arranged to receive a response from the local resource manager indicating whether its corresponding local resource can support a session, and the global resource manager sits on top of the operating system.

BRIEF DESCRIPTION OF THE DRAWINGS

These and other features and advantages of the present invention will become more apparent from a detailed consideration of the invention when taken in conjunction with the drawings in which:

FIG. 8 is a chart useful in resolving certain race conditions during distributed QoS negotiation and session preemption among concurrent application sessions; and, FIGS. 9–28 illustrate flow charts representing the procedures implemented by each node in negotiating with other nodes for the global processing of applications by the distributed data processing system illustrated in FIG. 1.

DETAILED DESCRIPTION

Figure 1:
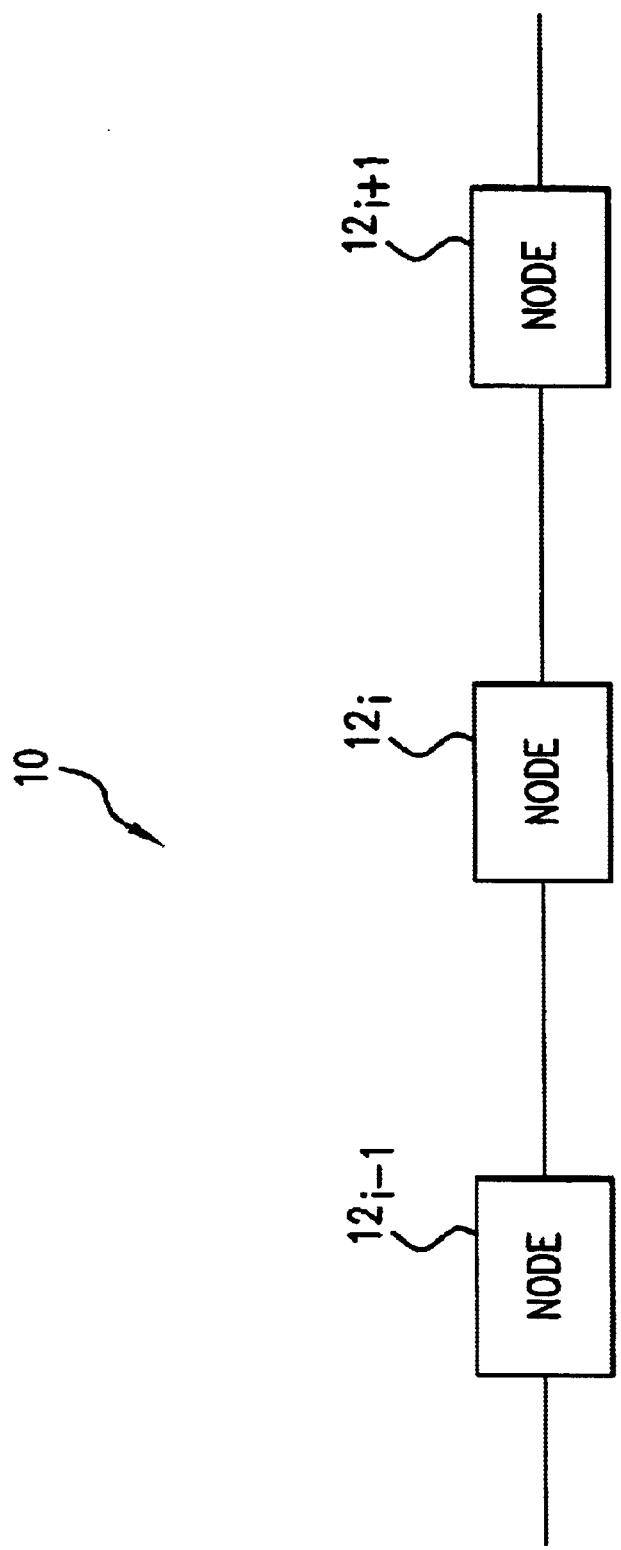
FIG. 1 is a block diagram of a distributed data processing system having a plurality of nodes according to the present invention.

A distributed data processing system 10, which provides an exemplary environment for the present invention, is illustrated in FIG. 1. The distributed data processing system 10 includes a plurality of processing nodes . . . , $12_{i-1}$, $12_i$, $12_{i+1}$, . . . . Although the plurality of processing nodes . . . , $12_{i-1}$, $12_i$, $12_{i+1}$, . . . of the distributed data processing system 10 are shown with a series topology, it should be understood that the plurality of processing nodes . . . , $12_{i-1}$, $12_i$, $12_{i+1}$, . . . of the distributed data processing system 10 may have any other topology, such as a tree topology.

Each processing node of the distributed data processing system 10 has a global resource manager 14 that (i) manages the local resource schedulers/managers of its corresponding processing node so that applications may be processed locally, and (ii) negotiates with the global resource managers of other nodes of the distributed data processing system 10 so that applications may be processed globally, as needed. For purposes of describing the present invention, it may be assumed that all processing nodes have a similar architecture so that only one processing node, such as the processing node $12_i$, is illustrated in detail in FIG. 2.

Figure 2:
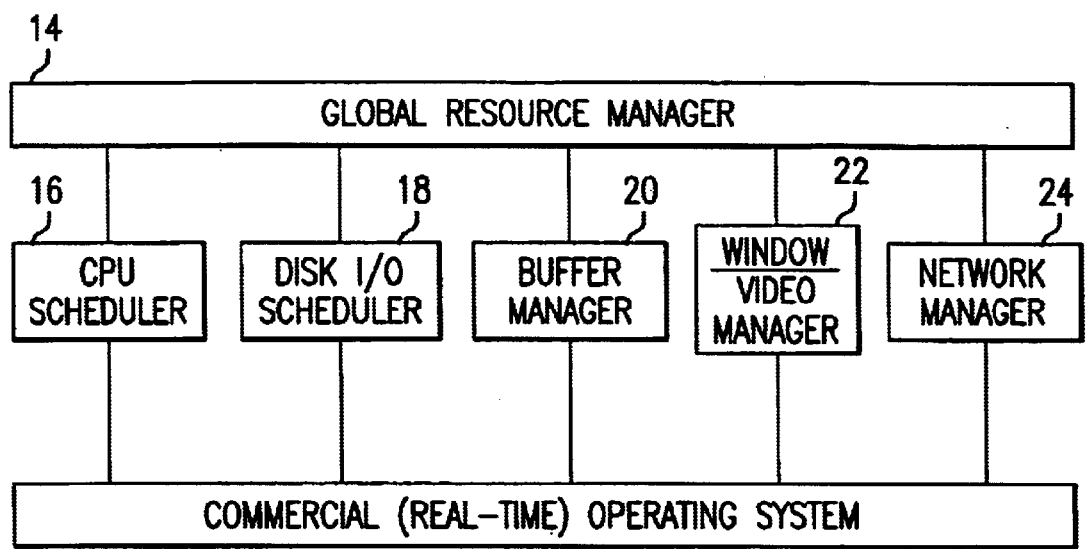
FIG. 2 is a block diagram of a typical node, such as a processing node $12_i$, of the distributed data processing system illustrated in FIG. 1.

The processing node $12_i$, as shown in FIG. 2, includes the global resource manager 14, which accepts certain inputs, that are described below, from a CPU scheduler 16, a disk I/O scheduler 18, a buffer manager 20, a window/video manager 22, and a network resource manager 24. The CPU scheduler 16, the disk I/O scheduler 18, the buffer manager 20, the window/video manager 22, and the network resource manager 24 may be provided by, or operate on top of, an operating system 26, such as Lynx™, Solaris™, or Windows NT™, in order to schedule access, respectively, to a CPU resource, a disk I/O resource, a buffer memory resource, a window/video processing resource, and network bandwidth. These resources are managed by the global resource manager 14. The global resource manager 14 also negotiates globally with the global resource managers of other nodes in order to determine whether the resources of the distributed data processing system 10 can be allocated to globally executed applications.

The operating system 26 functions to provide system primitive services, such as setting the priority of threads and preempting and executing threads. For example, these services may be provided through the POSIX™ standard operating system interface. The global resource manager 14, as described herein, sits on top of the operating system 26. Accordingly, the global resource manager 14 of the present invention does not require redesign of the operating system 26. Similarly, the global resource manager 14 of the present invention does not require redesign of the CPU scheduler 16, the disk I/O scheduler 18, the buffer manager 20, the window/video manager 22, and the network resource manager 24, but merely accepts certain inputs from the CPU scheduler 16, the disk I/O scheduler 18, the buffer manager 20, the window/video manager 22, and the network resource manager 24.

A mission-critical multimedia application to be processed by the processing node $12_i$ can be characterized by three factors—timing, quality of service (QoS), and criticality. Timing may be characterized by rate (λ) and latency (L). As described above, rate (λ) is defined as the number of media data units per second that are processed by the processing node $12_i$. For example, if the processing node $12_i$ processes video data, a media data unit may be a video frame, and the rate (λ) may be specified at thirty frames per second, which is standard for the transmission of conventional television signals in the United States. Latency (L) is the tolerable end-to-end delay from the time when the very first media unit is produced at a stream source to the time it reaches a stream destination. Rate (λ) and latency (L) are specified by the application user. An application user is a user of the distributed data processing system 10 who desires execution of an application.

QoS specifies the degree of service quality expected by the application from the underlying computer system. QoS may be defined in terms of a consecutive loss factor (CLF). QoS and CLF are inversely related so that, as the consecutive loss factor CLF goes up, the quality of service QoS goes down, and so that, as the consecutive loss factor CLF goes down, the quality of service QoS goes up. CLF is the number of consecutive data units which may be dropped between every two processing units.

Figure 3:
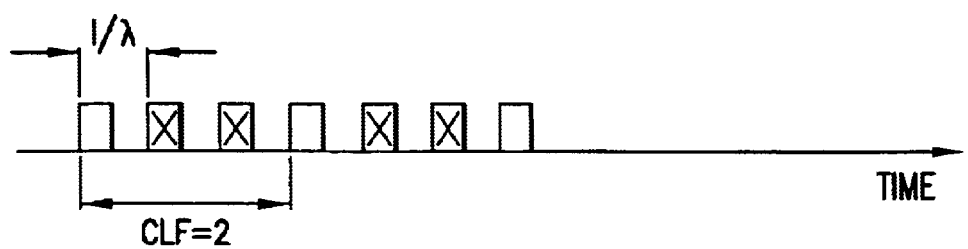
FIG. 3 is a timing diagram illustrating an example of a consecutive loss factor (CLF) which may be used to define quality of service (QoS) for an application running on the distributed data processing system of FIG. 1.

FIG. 3 illustrates an example of the consecutive loss factor (CLF). In this example, only one in three media data units (such as image frames) are being processed. Thus, two of every three data units are being dropped. Accordingly, the continuous loss factor (CLF) as shown in FIG. 3 is 2.

The application user specifies the CLF of an application that the application user desires to be executed so that the specified CLF is in the range $[0, CLF_{max}]$, where $CLF_{max}$ is the maximum number of consecutive data units which may be dropped between every two units processed. At run time, the application being processed by the processing node $12_i$ may adapt its CLF between 0 and $CLF_{max}$, depending on the availability of system resources. The application user, also, may re specify, on line, the CLF within the range $[0, CLF_{max}]$, depending on availability of system resources.

Alternatively, QoS may be defined in terms other than consecutive loss factor (CLF). For example, QoS may be defined in terms of a JPEG Quantization Factor (QFactor).

Criticality refers to the degree of application importance among concurrent applications. Importance may be throughput importance, economic importance, security importance, or the like. When not all applications can be processed by the processing node $12_i$, applications having lower criticality levels are preempted in favor of applications having higher criticality levels. A criticality level is determined and assigned by a system administrator, who administrates the applications submitted to the processing node $12_i$ for processing, and not by the application user who wishes to launch an application. If a criticality level were assigned by an application user launching an application, most applications would be given the highest possible criticality level by the application user so that preemption would not be meaningful. After the criticality level is determined and assigned by the system administrator, the application user inputs the assigned criticality level.

A continuous multimedia application may also be defined in terms of its sessions. A session is an internal system activity related to an execution behavior of a continuous multimedia application. When the execution behavior of an application changes, a new session of that application begins. As an example, video which is transmitted at thirty frames per second may define one session. When the transmission rate of the video is changed to twenty frames per second, the execution behavior of the application undergoes a mode change such that a new session is started and the old session ends. Accordingly, any one continuous multimedia application may be characterized by a plurality of sessions. A change in execution behavior of a continuous multimedia application is referred to herein as a mode change.

A distributed session is a session running on more than one node of a distributed processing system. A distributed session consists of several subsessions with each subsession running on a different processing node of the distributed processing system. As is known, each subsession consists of a set of system entities (e.g., producer threads, consumer threads, buffers) that form an execution path of the multimedia data flow between a producer process and a consumer process. The entire session is a unit of the ripple scheduling described below in connection with FIGS. 9–28.

A session's run time behavior is defined by four states. In a WAIT state, a session does not request execution. In a MODE CHANGE state, a session requests a mode change (for example, from pause to play, or from play at thirty frames per second to play at twenty frames per second) which may result in a different level of resource demand and, therefore, which requires a new admission test. In an EXECUTE state, a session is being executed by the system. In a PREEMPT state, a session is preempted from execution by the system.

Each subsession of a distributed session is in one of these states. The state of a subsession running on the processing node $12_i$ is manipulated by the global resource manager 14 of that node. During state transitions, it is possible and legitimate for the subsessions of a distributed session running on different processing nodes to be temporarily in different states.

When a session arrives at the processing node $12_i$, the processing node $12_i$ determines whether it can schedule the arriving session for execution. The global resource manager 14 of the processing node $12_i$ initiates a test-and-hold operation by its CPU scheduler 16, its disk I/O scheduler 18, its buffer manager 20, its window/video manager 22, and its network resource manager 24. In response to the test-and-hold operation, the CPU scheduler 16, the disk I/O scheduler 18, the buffer manager 20, the window/video manager 22, and the network resource manager 24 of the processing node $12_i$ determine whether they can support the arriving session. If the CPU scheduler 16, the disk I/O scheduler 18, the buffer manager 20, the window/video manager 22, and the network resource manager 24 of the processing node $12_i$ can support the arriving session, they return a YES response and a supportable QoS range to their global resource manager 14. If the CPU scheduler 16, the disk I/O scheduler 18, the buffer manager 20, the window/video manager 22, and the network resource manager 24 of the processing node $12_i$ cannot support the arriving session, they return a NO response to their global resource manager 14. Accordingly, the global resource manager 14 of the present invention can universally interface with any type of local resource manager/scheduler as long as the local resource manager/scheduler can determine supportability of an arriving session by its associated resource, and return either a YES response and corresponding supportable QoS range or a NO response.

The CPU scheduler 16, the disk I/O scheduler 18, the buffer manager 20, the window/video manager 22, and the network resource manager 24 of the processing node $12_i$ may each conduct a test-and-hold operation in order to calculate the availability of its corresponding resource according to following general formula: the amount of its resource capacity already allocated + the amount of its resource capacity requested by the arriving session ≦ the total amount of its resource capacity. That is, an arriving session can be executed by a resource if the resource capacity already allocated by the resource, plus the resource capacity of the resource requested by the arriving session, are less than or equal to the total resource capacity of the resource.

For example, if a CPU resource is managed by the CPU scheduler 16, and if the CPU scheduler 16 is a Rate Monotonic Analysis (RMA) scheduler, the total CPU capacity is 0.69 in terms of processor utilization. Assuming that there are n sessions $S_i$ being executed by the CPU and that a new session $S_k$ has just arrived, then the resource capacity of the CPU resource already allocated to the executing sessions $S_i$ is determined according to the following expression:

$$\sum_{i=1}^{n} \frac{\text{thread execution time of } S_i}{\text{thread execution period of } S_i} \quad (1)$$

and the resource capacity of the CPU resource required by the arriving session $S_k$ is determined according to the following expression:

$$\frac{\text{thread execution time of } S_k}{\text{thread execution period of } S_k} \quad (2)$$

Accordingly, the arriving session can be scheduled by the CPU resource if $$\sum_{i=1}^{n} \frac{\text{thread execution time of } S_i}{\text{thread execution period of } S_i} +$$

$$\frac{\text{thread execution time of } S_k}{\text{thread execution period of } S_k} \le 0.69 \quad (3)$$

The other resource schedulers/managers of the processing node $12_i$ can similarly determine whether they can support the arriving session.

Specifically, for a disk I/O scheduler, the following should be considered. Commercial disk subsystems usually provide I/O scheduling support, often with a SCAN algorithm, at the SCSI controller level. Thus, in order to reduce disk head movement overhead and to guarantee a bounded access time, the global resource manager 14 employs a simple interval-based I/O access policy. Accordingly, let $$L = \text{Min}(L_i) \quad (4)$$

where $1 \le i \le n$, and where L is the latency tolerable by all of the n sessions relating to all of the applications being executed by the processing node $12_i$ at a given time. Accordingly, L is the time interval for scheduling of concurrent media streams. If it is assumed that the amount of contiguous data that the disk I/O resource 34 can transfer in one second is $D_{max}$, and that the average disk seek time, for serving each I/O request within L is S, then, during the time interval L, the effective transfer time is L−nS. Therefore, the n sessions can be schedulable only if $$\sum_{i=1}^{n} x_i u_i \le (L - nS) D_{max} \quad (5)$$

where $x_i = \lceil r_i L \rceil$, where $u_i$ is the size of one data unit, and where the quantity $D_{max}$ and the average disk seek time S are constraints of the disk I/O resource 34. The quantity $r_i$ for session i may be determined from the following equation:

$$r_i = \frac{\lambda_i}{1 + CLFa_i} \quad (6)$$

where $\lambda_i$ is specified by the application user for an application corresponding to session i, where $CLF_{ai}$ is the actual CLF for sessions i and is determined as described below, and where $CLFa_i \in [0, CLFmax_i]$. The equation (5) may be rewritten according to the following equation:

$$\sum_{i=1}^{n} x_i u_i - nSD_{max} \le LD_{max}. \quad (7)$$

For a CPU scheduler, all threads are periodic in nature. Furthermore, thread access to media data buffers is non-blocking when a double-buffering technique is employed. Thus, a standard rate monotonic analysis (RMA) approach for CPU scheduling may be adopted. That is, a number of sessions n are schedulable for the CPU resource scheduled by the CPU scheduler 16 if the following equation is satisfied:

$$\sum_{i=1}^{n} (e_i r_i + e'_i / L) \le ln2 \equiv C_{max} \quad (8)$$

where $e_i$ is the execution time of the CPU for processing one unit of media data, and where $e'_i$ is the execution time of the CPU for a disk I/O operation. $C_{max}$ is the maximum cycle rate of the CPU.

With respect to the window/video manager 22, the n sessions being executed may deliver video frames at an aggregate rate defined by the following expression:

$$\sum_{i=1}^{n} r_i. \quad (9)$$

If $V_{max}$ is the maximum video rate supportable by the window/video processing software of the window/video processing resource managed by the window/video manager 22, then n sessions may be schedulable if the following expression is satisfied:

$$\sum_{i=1}^{n} r_i \le V_{max}. \quad (10)$$

The buffer manager 20 allocates and de-allocates memory using the underlying operating system services provided by the operating system 26. The n sessions consume bytes of memory defined by the following expression:

$$2 \sum_{i=1}^{n} x_i u_i. \quad (11)$$

If the maximum memory space available is $M_{max}$ bytes, then n sessions can be supported if the following equation is satisfied:

$$2 \sum_{i=1}^{n} x_i u_i \le M_{max}. \quad (12)$$

The network resource manager 24 assesses network bandwidth, and determines whether the distributed data processing system 10 has sufficient bandwidth to process an application. For the network resource manager 14, given a high-performance network with a Constant Bit Rate (CBR), service, the n sessions can be supported for network communication if the following equation is satisfied:

$$\sum_{i=1}^{n} 8x_i u_i r_i \le N_{max}. \quad (13)$$

where $N_{max}$ is the maximum CBR bandwidth at the processing node $12_i$.

Accordingly, the n sessions are schedulable by the processing node $12_i$ if the resource constraints established by the equations (7), (8), (10) (12), and (13) are met. Resource constraints similar to the equations (7), (8), (10), (12), and (13) may be developed for any other resources of the processing node $12_i$.

As described above, the global resource manager 14 of each of the processing nodes ..., $12_{i-1}$, $12_i$, $12_{i+1}$, ... may be arranged to negotiate with others of the processing nodes ..., $12_{i-1}$, $12_i$, $12_{i+1}$, ... in order to execute sessions of applications requiring global execution. In order to execute sessions of applications globally, each of the global resource managers 14 of the processing nodes ..., $12_{i-1}$, $12_i$, $12_{i+1}$, ... is arranged to process corresponding subsessions of the sessions of the applications which are launched onto the distributed data processing system 10.

An application may be launched through any of the processing nodes ..., $12_{i-1}$, $12_i$, $12_{i+1}$, ... of the distributed data processing system 10. During its lifetime, an application may operate in different modes (for example, PLAY, FAST FORWARD, PAUSE, etc. in the case of a video playback application) with each mode requiring a certain amount of resources. The point of application transition from one mode to another is referred to as a mode change. This point ends one session of the application and begins another session of the application. A node which initiates such a: mode change is referred to herein as a coordinator node. For example, if a mode change from PAUSE to PLAY is requested through the processing node $12_i$, the processing node $12_i$ becomes the coordinator node of the scheduling spanning tree for the application. On the other hand, if the mode change from PAUSE to PLAY is requested through the processing node $12_{i-1}$, the processing node $12_{i-1}$ becomes the coordinator node of the scheduling spanning tree for the application. A scheduling spanning tree, and its coordinator node, are defined on the basis of an application mode change, and are explained in more detail below.

Also as discussed below, when an application requests a mode change, its coordinator node initiates an end-to-end resource negotiation among the processing nodes which are to participate in the processing of the application session. Accordingly, the coordinator node inquires of the downstream participating nodes, with which it is in direct communication, as to whether these downstream participating nodes have the resource capacity to support the application session to be executed. These downstream participating nodes in turn inquire of their downstream participating nodes, with which they are in direct communication, as to whether their downstream participating nodes can support the application session. This inquiry continues to be likewise pushed downstream so that all of the processing nodes which are needed to process the application session are inquired as to their support capacity.

Figure 4:
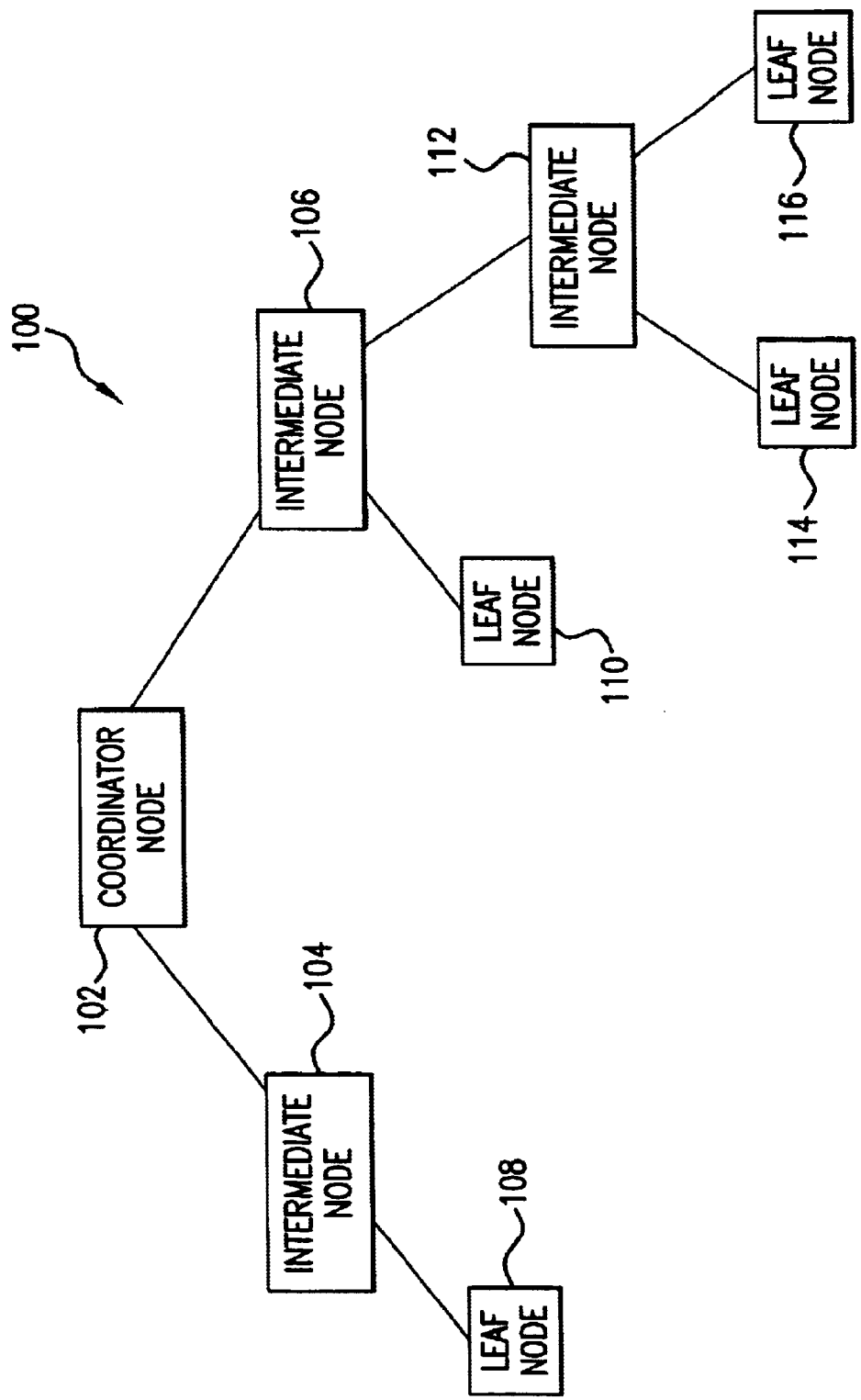
FIG. 4 is a block diagram illustrating a scheduling spanning tree resulting from the distributed data processing of an application by the distributed data processing system of FIG. 1.

Thus, a scheduling spanning tree, such as a scheduling spanning tree 100 as illustrated in FIG. 4, can result. The scheduling spanning tree 100 includes a coordinator node 102. If the coordinator node 102 has the resource capacity to execute the arriving session, it inquires of the processing nodes, which are in direct communication with the coordinator node 102 and which are to also process the application, as to whether these nodes have the resource capacity to execute the arriving, session. In the example shown in FIG. 4, there are two processing nodes, an intermediate node 104 and an intermediate node 106, which are in direct communication with the coordinator node 102 for the purpose of processing the arriving session.

Accordingly, these intermediate nodes 104 and 106 receive the inquiry from the coordinator node 102. If they have the resource capacity to execute the application, they push the inquiry to their downstream processing nodes which are also to process the arriving session by the coordinator node 102. For example, the intermediate node 104 pushes the inquiry to a leaf node 108. The leaf node 108 is referred to as a leaf node because it is at the end of a processing branch of the scheduling spanning tree 100. Similarly, the intermediate node 106 pushes the inquiry from the coordinator node 102 to a leaf node 110 and to another intermediate node 112. If the intermediate node 112 has the resource capacity to execute the arriving session, the intermediate node 112 further pushes the inquiry to a leaf node 114 and to a leaf node 116.

Responses indicating whether the intermediate and/or leaf nodes have the resource capacity to execute the arriving session are pushed upstream from the leaf nodes through their upstream intermediate nodes to the coordinator node. The coordinator node then determines whether the arriving session can be executed by the participating nodes.

A node may sometimes be referred to herein as a parent node if it pushes an inquiry to downstream nodes, and these downstream nodes may sometimes be referred to herein as child nodes. Accordingly, (i) the coordinator node 102 is a parent node but not a child node, (ii) the intermediate nodes 104 and 106 are child nodes of the coordinator node 102 and parent nodes of the leaf nodes 108 and 110 and the intermediate node 112, (iii) the intermediate node 112 is a child node of the intermediate node 106 and a parent node of the leaf nodes 114 and 116, and (iv) the leaf nodes 108, 110, 114, and 116 are child nodes of the intermediate nodes 104, 106, and 112.

Figure 5:
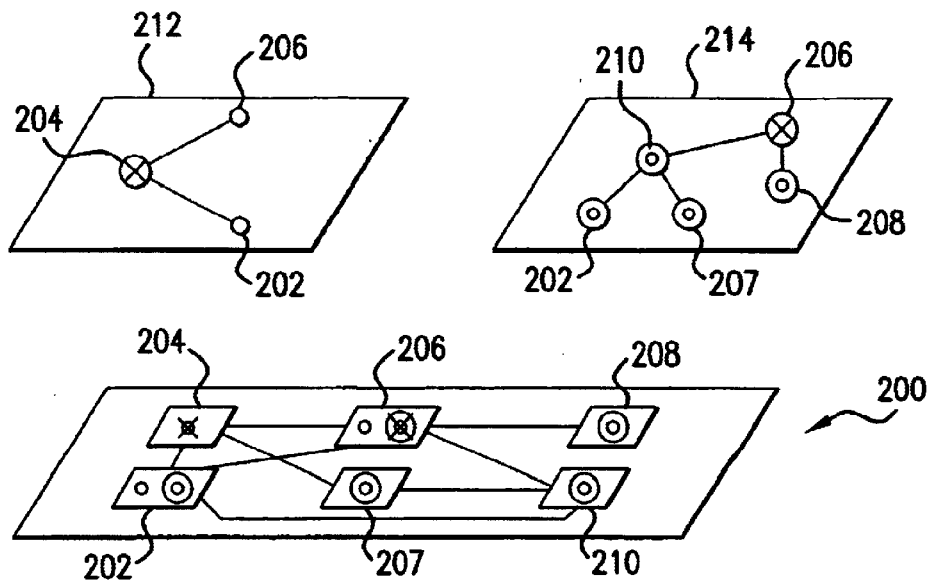
FIG. 5 is a diagram illustrating that different scheduling spanning trees for different applications may exist at the same time.

Execution of multiple applications may involve multiple scheduling spanning trees. That is, each application will result in a specific scheduling spanning tree according to its data processing path and for an existing distributed data processing system. For example, as shown in FIG. 5, the distributed data processing system 10 may take the form of a distributed data processing system 200 which includes a plurality of nodes 202, 204, 206, 207, 208, and 210. Execution of application A requires the resources of the nodes 202, 204, and 206 in a scheduling spanning tree 212 with the node 204 acting as the coordinator node. However, execution of application B requires the resources of the nodes 202, 206, 207, 208, and 210 in a scheduling spanning tree 214 with the node 206 acting as the coordinator node. Thus, the nodes 202 and 206 participate in both of the scheduling spanning trees 212 and 214.

Figure 6:
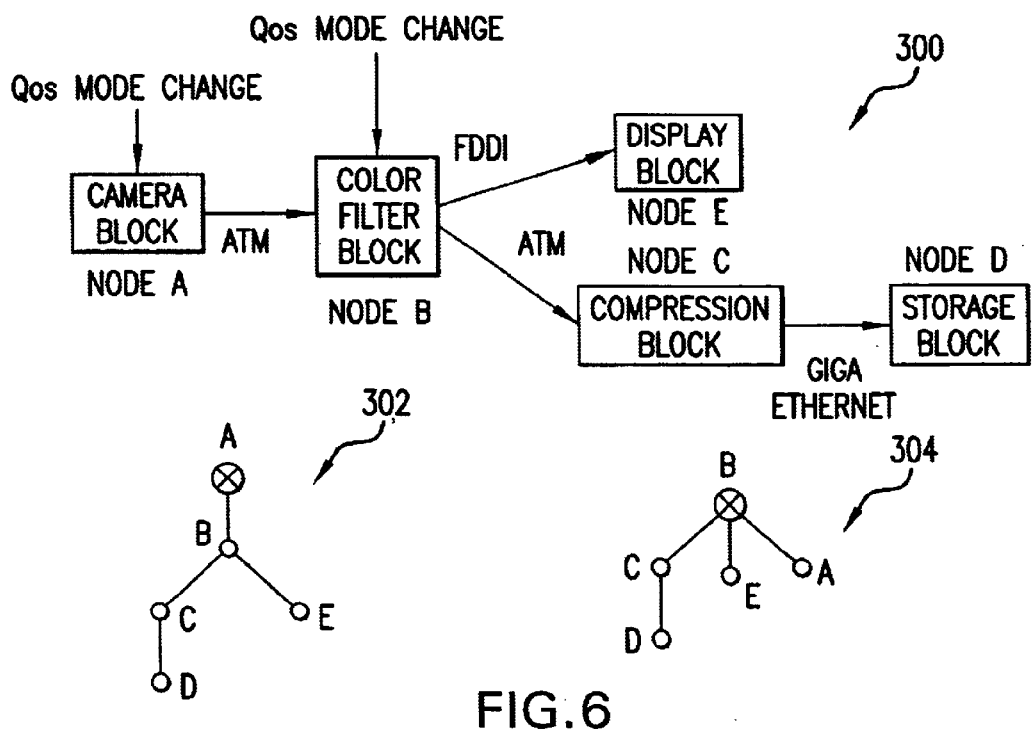
FIG. 6 is a diagram illustrating that different scheduling spanning trees for the same application may exist at different times.

Moreover, the same application may have different scheduling spanning trees and different coordinator nodes depending on where mode changes are made. Examples of multiple scheduling spanning trees for the same application are illustrated in FIG. 6 where a distributed image processing application 300 is being executed. The distributed image processing application 300 runs on nodes A, B, C, D, and E which are interconnected by heterogeneous networks ATM, FDDI, and GigaEthernet. In general, an application mode change can be requested on any one of the five nodes. As shown in FIG. 6, a scheduling spanning tree 302, for example, results from a mode change request initiated on node A at time t1, and a scheduling spanning tree 304 results from a mode change request initiated on node B at time t2. In the scheduling spanning tree 302, node A is the coordinator node, and in the scheduling spanning tree 304, node B is the coordinator node. Thus, because of mode changes, different scheduling spanning trees with different coordinator nodes may result for the same application.

In comparing FIGS. 5 and 6, it may be noted that the scheduling spanning trees of different applications can include different nodes, while the scheduling spanning trees of the same application include the same nodes.

Figure 7:
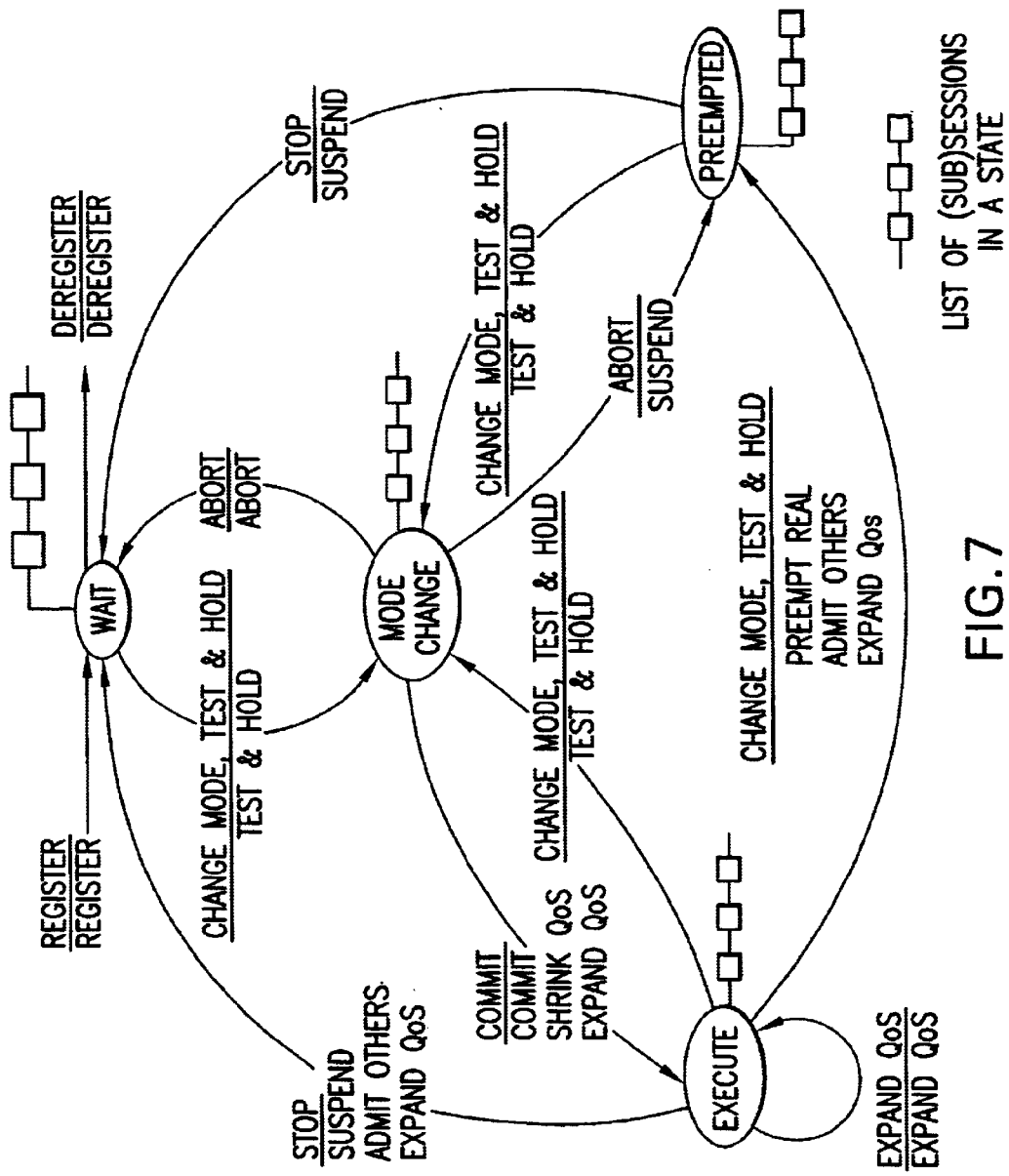
FIG. 7 is a state diagram which describes execution of application sessions on a node.
Figure 9:
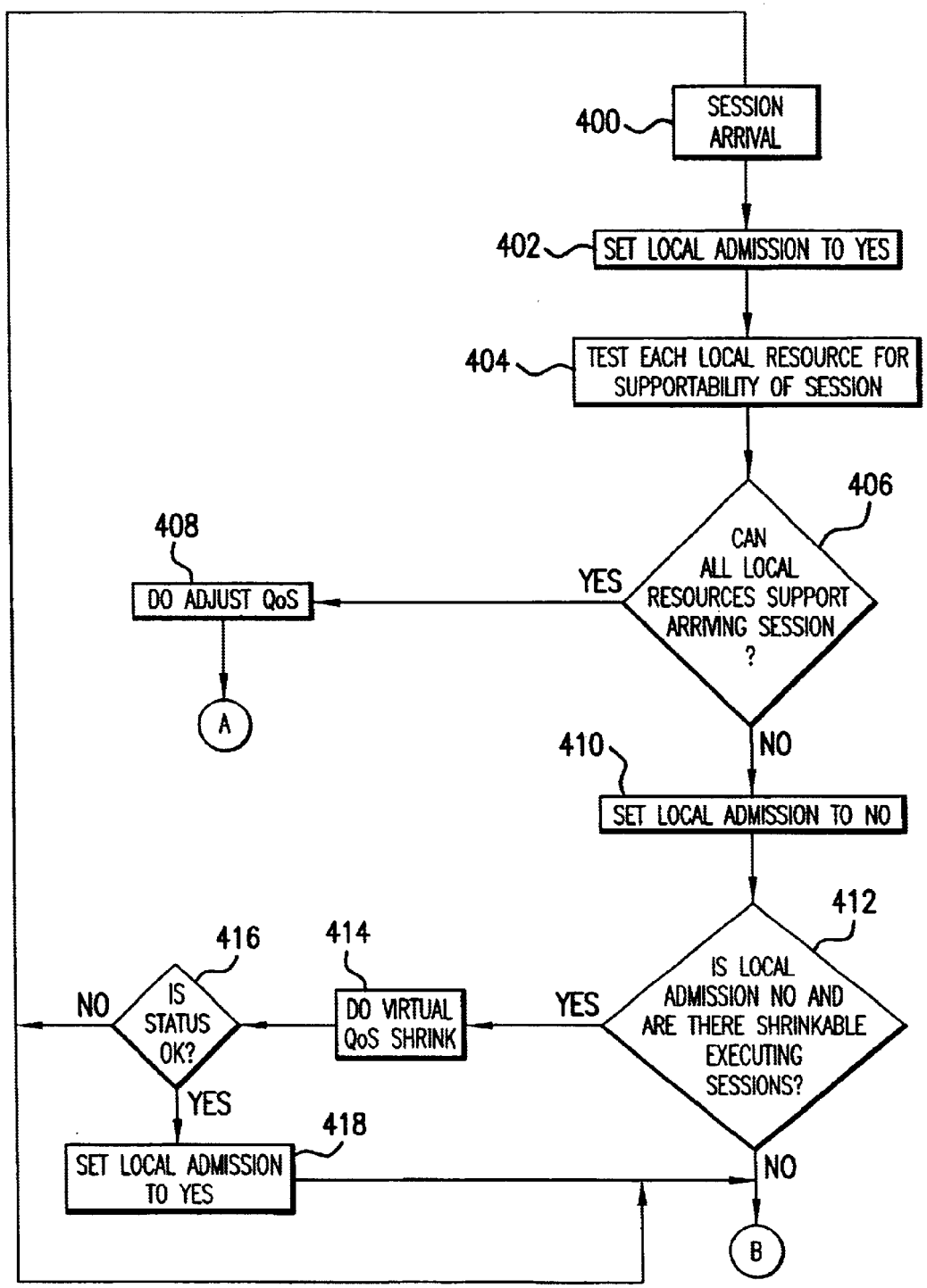
Figure 10:
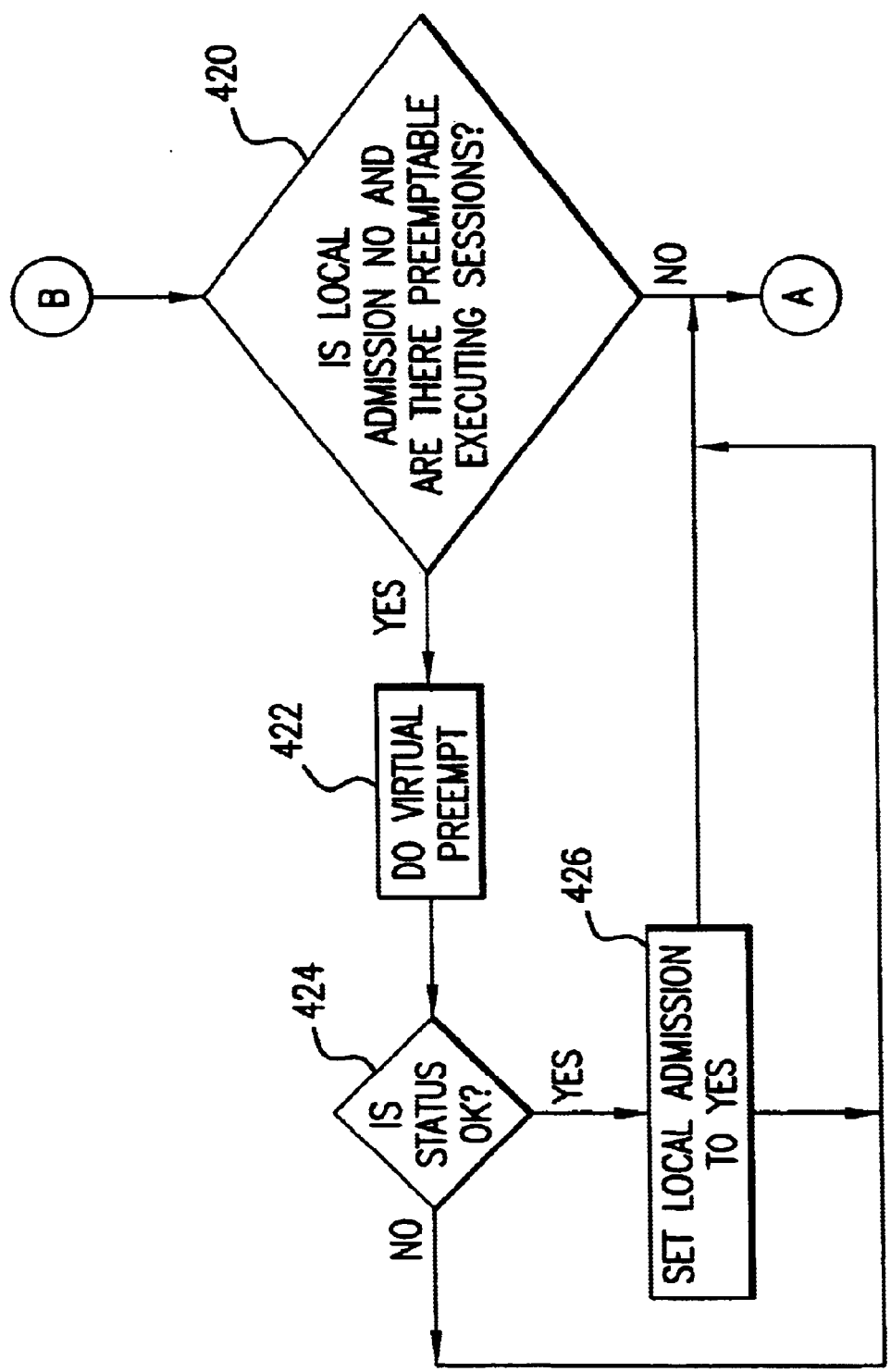

FIG. 7 is a state diagram which describes execution of sessions on a node and which includes WAIT, MODE CHANGE, EXECUTE, and PREEMPTED states. This state diagram uses an event/action nomenclature. An event is an instance of application/software activity that triggers a system action which may lead to a session state transition. For example, when the application user of an application elects to stop execution of an application's session, the "stop" request is an event. The actions that may result from the stop event include (i) the suspension of the stopped session, which transitions from the EXECUTE state to the WAIT state, (ii) the admission of other sessions due to extra resources which have been freed up because of the suspension of the stopped session, and/or (iii) the expansion of the QoS's of the other executing sessions. The nomenclature and flow represented by this state diagram may be additionally understood from the discussion below in connection with the flow charts of FIGS. 9–28.

A session may enter the WAIT state because it has just arrived (Register) at the node, a session may enter the WAIT state from the EXECUTE state or from the PREEMPTED state because it was stopped by a user, or a session may re-enter the WAIT state from the MODE CHANGE state because a mode change occurred while it was in the WAIT state but its request for execution was not admitted due to insufficient resources as determined during a test-and-hold operation. A test-and-hold operation may involve testing the resources of a node according to applicable resource constraints, such as the resource constraints established by the equations (7), (8), (10), (12), and (13), in order to determine (i) if a session can enter the EXECUTE state without QoS shrinking, (ii) if a session can enter the EXECUTE state with QoS shrinking but without preemption of other sessions, (iii) if the session can enter the EXECUTE state only through QoS shrinking and preemption of other sessions, or (iv) if the session cannot enter the EXECUTE state even with QoS shrinking and preemption of other sessions.

A session can enter the EXECUTE state from the WAIT state following a mode change, a session can enter the EXECUTE state from the PREEMPTED state following a mode change, and a session can stay in the EXECUTE state from the EXECUTE state following a mode change. Also, a session can enter the PREEMPTED state from the EXECUTE state following a mode change, and a session can stay in the PREEMPTED state from the PREEMPTED state following a mode change.

Upon the occurrence of a mode change, a test-and-hold operation is performed by each global resource manager and by each local resource scheduler/manager. The test-and-hold operation determines which of the executing sessions and the session associated with the application causing the mode change (referred to herein as the arriving session) can be executed. If there is sufficient resource capacity to execute the arriving session, the arriving, session enters the EXECUTE state and the executing sessions stay in the EXECUTE state.

If the resource capacity is not sufficient to execute the arriving session, the QoS's of the executing sessions and the arriving session are shrunk. The order of QoS shrinking is a policy matter as discussed below. If this QoS shrinking frees sufficient resources to permit execution of the arriving session, the arriving sessions enters the EXECUTE state.

If this QoS shrinking does not free sufficient resources to permit execution of the arriving session, one or more executing sessions may be preempted until sufficient resources have been freed up to permit execution of the arriving session. As discussed below, the choice of preemption order is a policy matter. If preemption of one or more executing sessions frees up sufficient resources to permit execution of the arriving session, the arriving session enters the EXECUTE state, the executing sessions not preempted stay in the EXECUTE state, and the preempted executing sessions enter the PREEMPTED state.

If preemption of one or more executing sessions does not free up sufficient resources to permit execution of the arriving session, the arriving session enters the PREEMPTED state and the executing sessions stay in the EXECUTE state.

A session can enter the PREEMPTED state from the EXECUTE state following a mode change, and a session can stay in the PREEMPTED state from the PREEMPTED state following a mode change. Upon the occurrence of a mode change (when, for example, resource capacity is freed up because an executing session is completely executed), a test-and-hold operation is performed. The test-and-hold operation determines which of the preempted sessions (i.e., sessions in the PREEMPTED state) can be executed.

If there is sufficient resource capacity to execute the preempted sessions, the preempted sessions enter the EXECUTE state. If the resource capacity is not sufficient to execute the preempted sessions, the QoS's of the executing sessions and the preempted sessions are shrunk. If this QoS shrinking frees sufficient resources to permit execution of one or more preempted sessions, the one or more preempted sessions enter the EXECUTE state, and the remaining preempted sessions, if any, stay in the PREEMPTED state.

If QoS shrinking does not free sufficient resources to permit execution of one or more preempted sessions, all preempted sessions stay in the PREEMPTED state.

The order in which the QoS's of sessions are shrunk is a policy matter for the system administrator. For example, in order to reduce overhead of the global resource manager 14, the QoS's of sessions may be shrunk in order of the size of the current scheduling spanning trees, with the QoS's of sessions of the smallest current scheduling spanning trees being shrunk first. Alternatively, in order to reduce system wide resource consumption, the QoS's of sessions may be shrunk in order of the size of the current scheduling spanning trees, with the QoS's of sessions of the largest current scheduling spanning trees being shrunk first. As a further alternative, in order to discourage long running applications, the QoS's of sessions may be shrunk in order of running time, with the QoS's of the longest running sessions being shrunk first. As a still further alternative, the QoS's of sessions may be shrunk in a random order. As yet a further alternative, in order to provide better QoS's for high criticality sessions, the QoS's of sessions may be shrunk in order of criticality, with the QoS's of the sessions having the lowest criticality being shrunk first. Criticality is assigned by the system administrator to an application. Sessions of an application have the same criticality as their application.

Sessions may be preempted in any order. For example, sessions may be preempted according to their criticality, with sessions having the lowest assigned criticality being preempted first. However, in the case of ties (where tying sessions have the same assigned criticality), a tie breaker may be used to decide which of the tying sessions is preempted. A tie breaker may be chosen as a policy matter by the system administrator. For example, in order to reduce overhead of the global resource manager 14, sessions may be preempted in order of the size of their scheduling spanning trees, with the sessions of the smallest current scheduling spanning trees being preempted first. Alternatively, in order to reduce system wide resource consumption, sessions may be preempted in order of the size of their scheduling, spanning trees, with the sessions of the largest current scheduling spanning trees being preempted first. As a further alternative, in order to discourage long running applications, sessions may be preempted in order of running time, with the longest running session being preempted first. As a still further alternative, sessions may be preempted in a random order.

Again as shown in FIG. 7, a session may enter the MODE CHANGE state from the EXECUTE state, from the WAIT state, or from the PREEMPTED state, because of a mode change initiated by a user. In all cases, a mode change results in the testing (test-and-hold) of node resources in order to determine whether the resources are sufficient to permit admission of the session.

A session may enter the EXECUTE state from the MODE CHANGE state because a mode change occurred while it was in the EXECUTE state, in the WAIT state, or in the PREEMPTED state, and because its admission to the EXECUTE state was committed due to sufficient resources as determined during a test-and-hold operation. A session may stay in the EXECUTE state from the EXECUTE state with an expanded QoS.

A session may enter the PREEMPTED state from the EXECUTE state because a test-and-hold operation determines that the resources of the node are not sufficient to permit continued execution of the session. A session may re-enter the PREEMPTED state from the MODE CHANGE state because a mode change occurred while it was in the PREEMPTED state but its admission to the EXECUTE state was aborted due to insufficient resources as determined during a test-and-hold operation.

There may frequently occur times when two sessions attempt conflicting operations. For example, when a first session has a subsession in a MODE CHANGE state on node A and a subsession in an EXECUTE state on node B at time t1, a second session may attempt to preempt the first session at node B at time t1. As another example, first and second sessions may attempt to shrink the QoS's of each other at the same time. These conditions are referred to as race conditions. Race conditions are treated in the manner shown in the chart of FIG. 8.

As shown in FIG. 8, sessions $S_i$ and $S_j$ are not allowed to shrink each other's QoS at the same time, sessions $S_i$ and $S_j$ are not allowed to preempt each other at the same time, session $S_i$ is not allowed to preempt $S_j$ at the same time that session $S_j$ is attempting shrink the QoS of session $S_i$, and session $S_j$ is not allowed to preempt session $S_i$ at the same time that session $S_i$ is attempting shrink the QoS of session $S_j$. Instead, session $S_i$ or session $S_j$ may be held until the other session's operation is complete. For example, each session may retry its attempt after waiting a corresponding delay time based on its assigned criticality. This delay time may be randomly or pseudorandomly selected for each such session. For example, a delay time may be determined from the following equation:

$$T = \frac{t_1}{C} + \frac{t_2}{r} \qquad (14)$$

where T is the delay time, C is the assigned criticality level, r is a randomly or pseudorandomly selected number, and $t_1$ and $t_2$ are constants that satisfy the following expression:

$$\frac{t_1}{C} < \frac{t_2}{r}. \qquad (15)$$

The effect of the equations (14) and (15) is to give sessions having higher assigned criticality levels a shorter waiting time while sessions having the same assigned criticality level are given a random or pseudorandom waiting time. Accordingly, it is probable that sessions $S_i$ and $S_j$ will have different corresponding delay times $T_i$ and $T_j$ so that their retry attempts will not occur at the same time.

Alternatively, the two sessions may be queued for processing at a later time when, hopefully, the race condition no longer exists. As a still further alternative, a combination of queuing and random selection may be employed.

Also as shown in FIG. 8, if session $S_j$ attempts to shrink the QoS of session $S_i$ which is in the EXECUTE state, all subsessions of session $S_i$ are locked so that they cannot be affected by sessions other than session $S_j$. Likewise, if session $S_i$ attempts to shrink the QoS of session $S_j$ which is in the EXECUTE state, all subsessions of session $S_j$ are locked so that they cannot be affected by sessions other than session $S_i$. Moreover, if session $S_j$ attempts to preempt session $S_i$ which is in the EXECUTE state, all subsessions of session $S_i$ are locked so that they cannot be affected by sessions other than session $S_j$. Likewise, if session $S_i$ attempts to preempt session $S_j$ which is in the EXECUTE state, all subsessions of session $S_j$ are locked so that they cannot be affected by sessions other that session $S_i$.

The global resource manager 14 of each of the processing nodes . . . , 12$_{i-1}$, 12$_i$, 12$_{i+1}$, . . . of the distributed data processing system 10, accordingly, is capable of operating according to the flow charts illustrated in FIGS. 9–13 during a first phase of operation, which may referred to herein as the test-and-hold phase. The global resource manager 14 of each of the processing nodes . . . , 12$_{i-1}$, 12$_i$, 12$_{i+1}$, . . . of the distributed data processing system 10 is also capable of operating according to the flow charts illustrated in FIGS. 14 and 15 during a second phase of operation, which may referred to herein as the commit/abort phase. FIGS. 16–28 illustrate routines executed during operation according to the flow charts illustrated in FIGS. 9–15.

Figure 11:
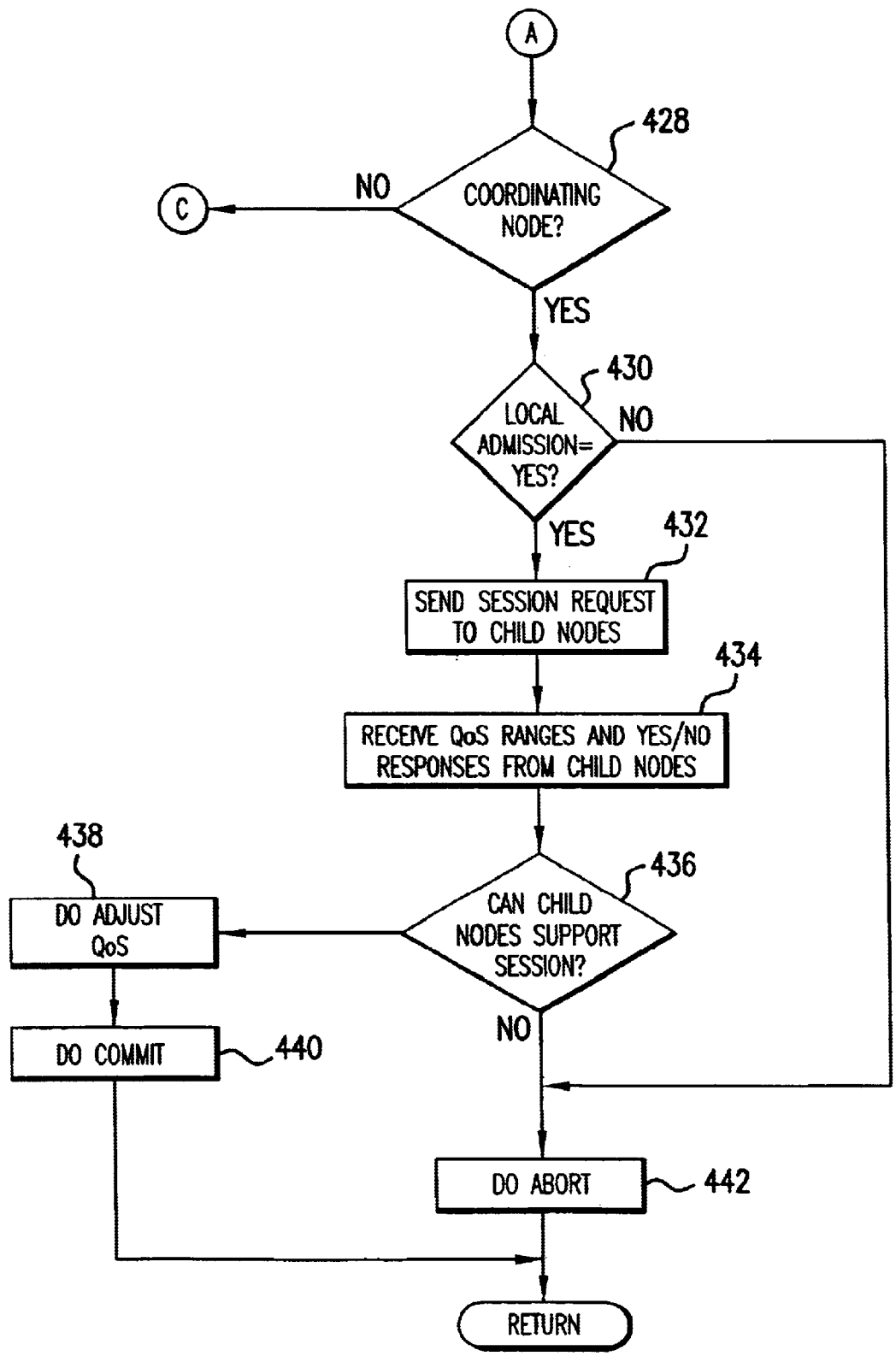
Figure 12:
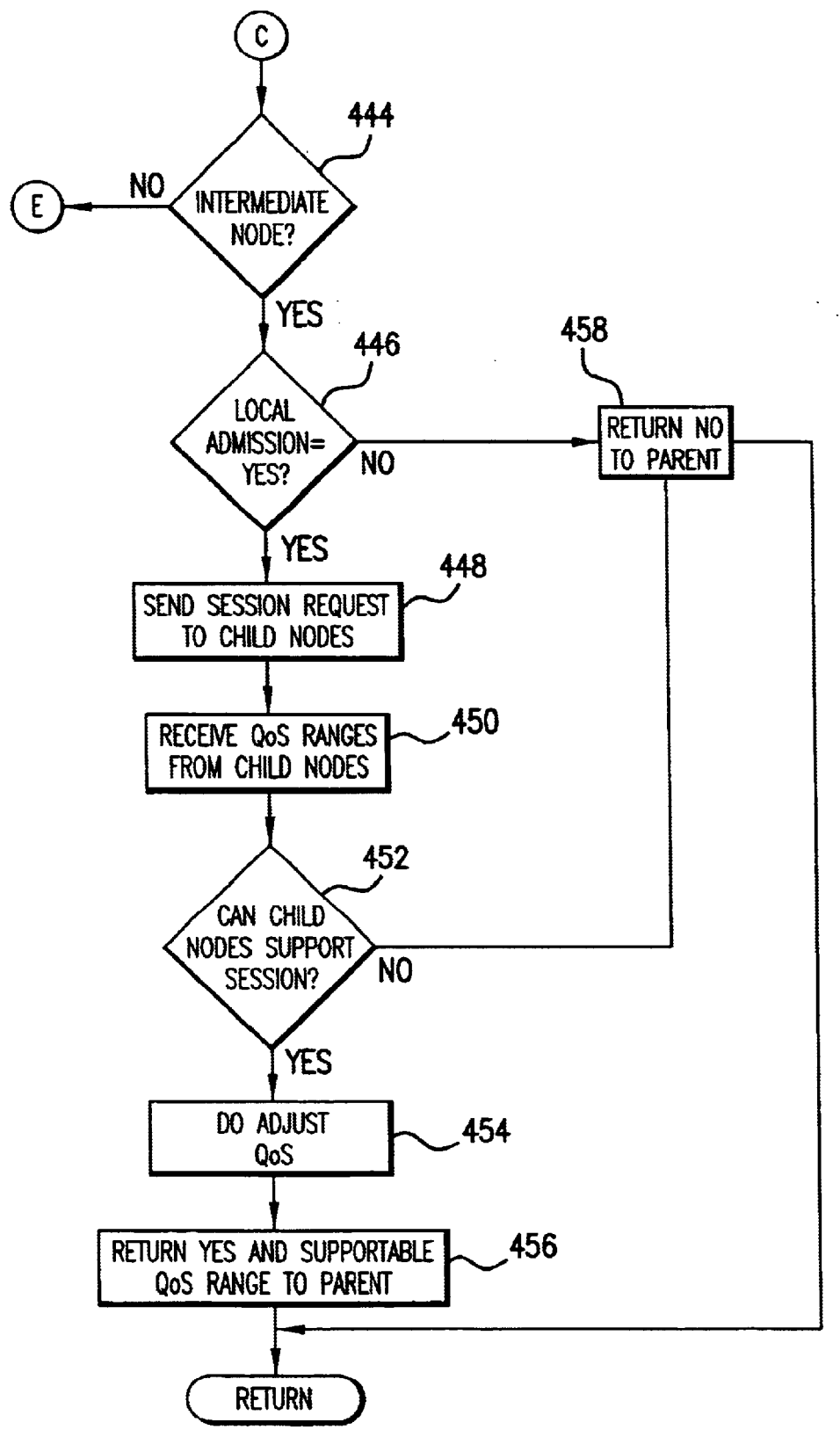
Figure 13:
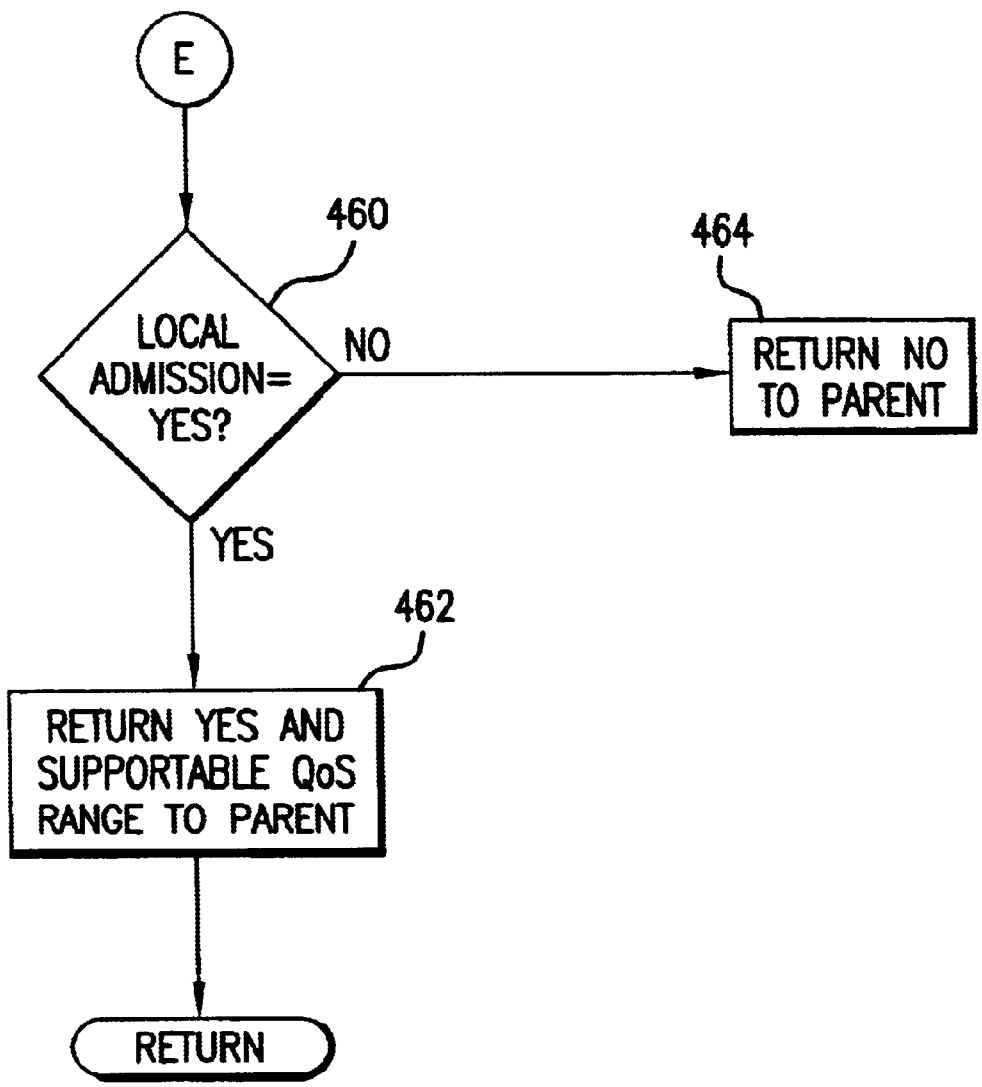

Moreover, all nodes operate according to the flow charts of FIGS. 9, 10, 14, and 15, the coordinator node additionally operates according to the flow chart of FIG. 11, all intermediate nodes additionally operate according to the flow chart of FIG. 12, and all leaf nodes additionally operate according to the flow chart of FIG. 13.

Furthermore, because a node may be a coordinator node for one scheduling spanning tree, an intermediate node for another scheduling spanning tree, and a leaf node for still another scheduling spanning tree, each node is capable of operating in accordance with all of the flow charts illustrated in FIGS. 9–28. Also, a node may be a coordinator node for one scheduling spanning tree, an intermediate node for another scheduling spanning tree, and a leaf node for still another scheduling spanning tree, all at the same time.

A session arrives at a coordinator node because of a mode change initiated at the coordinator node with respect to an application currently being executed, and a session arrives at an intermediate node and a leaf node because of a session request from the coordinator node. A session request is a request by the coordinator node for execution of a session by a node receiving the session request. When a session arrives at a processing node, the arriving session has associated therewith an arriving session QoS which is the QoS for the arriving session requested by the user when the application corresponding to the arriving session is launched or when a mode change is initiated by the user that affects the session's QoS.

Upon the arrival of the session at a processing node as indicated by a block 400, the processing node at a block 402 sets a LOCAL ADMISSION flag to YES and, at a block 404, instructs its local resources, such as its CPU resource scheduled by the CPU scheduler 16, its disk I/O resource scheduled by the disk I/O scheduler 18, its buffer resource managed by the buffer manager 20, its window/video processing resource managed by the window/video manager 22, and/or its network resource managed by the network manager 24 to perform a test-and-hold operation in order to determine whether the QoS of the newly arrived session can be supported by those local resources. For example, the local resources may test their resources according to applicable resource constraints, such as the resource constraints established by the equations (7), (8), (10), (12), and (13) (with the arriving session added to the n sessions), in order to determine (i) if the arriving, session can enter the EXECUTE state without QoS shrinking and preemption of other sessions, (ii) if the arriving session can enter the EXECUTE state with QoS shrinking, but without preemption, of other sessions, (iii) if the arriving session can enter the EXECUTE state with QoS shrinking and preemption of other sessions, or (iv) if the arriving session cannot enter the EXECUTE state even with QoS shrinking and preemption of other sessions.

After conclusion of the test at the block 404, the processing node at a block 406 determines whether the test conducted at the block 404 indicates that the arriving session is supportable without QoS shrinking and preemption of any of the other sessions currently being executed by the processing node. If the arriving session is supportable without preemption, the processing node at a block 408 adjusts the QoS ranges supportable by all the resources for the arriving session to the highest supportable QoS in such a way that a QoS range common to all the supportable ranges is selected. For example, if the CPU resource scheduled by the CPU scheduler 16 can support the QoS range [QoSmin=CLF 3, QoSmax=CLF 0], and if the network managed by the network resource manager 24 can support the QoS range [QoSmin=CLF 2, QoSmax=CLF 1], the processing node at the block 408 consolidates the two QoS ranges by selecting the common QoS range [QoSmin=CLF 3, QoSmax=CLF 1] that is supportable by the resources of both resource managers.

On the other hand, if the processing node determines at the block 406 that, as a result of the test conducted at the block 404, it cannot support the arriving session without QoS shrinking and preemption, the processing node at a block 410 sets the LOCAL ADMISSION flag to NO, and determines at a block 412 whether the LOCAL ADMISSION flag is set to NO and whether there are other sessions currently being executed by the node whose QoS's are shrinkable. A QoS of a session is shrinkable if the QoS for that session is not already at its minimum. If the LOCAL ADMISSION flag is set to NO and if there are other sessions whose QoS's are shrinkable, the processing node at a block 414 executes a virtual QoS shrink routine described below in connection with FIG. 20. At a block 416, the processing node determines whether a STATUS flag is set to OK as a result of execution of the virtual QoS shrink routine. If the STATUS flag is set to OK, the processing node sets the LOCAL ADMISSION flag to YES at a block 418. If the LOCAL ADMISSION flag is set to YES at this point, the arriving session can be admitted by merely shrinking the QoS's of the arriving, session and of one or more of the executing sessions, and preemption of one or more executing sessions is not necessary to admit the arriving session.

After the processing node sets its LOCAL ADMISSION flag to YES at the block 418, or if the processing node at the block 412 determines that there are no other sessions currently being,executed by the node whose QoS's are shrinkable, or if the STATUS flag is set to NO as determined at the block 416, the processing node determines at a block 420 whether the LOCAL ADMISSION flag is set to NO and whether there are sessions currently being executed by the node which are preemptable. If the LOCAL ADMISSION flag is set to NO and if there are executing sessions which are preemptable, the processing node at a block 422 executes a virtual preempt routine described below in connection with FIG. 16. At a block 424, the processing node determines whether a STATUS flag is set to OK as a result of execution of the virtual preempt routine. If the STATUS flag is set to OK, the processing node sets the LOCAL ADMISSION flag to YES at a block 426. If the LOCAL ADMISSION flag is set to YES at this point, the arriving session cannot be admitted by merely shrinking the QoS's of the arriving session and the executing sessions, and preemption of one or more executing sessions is necessary to admit the arriving session.

After the block 408 adjusts the QoS of the arriving session, or if the processing node at the block 420 determines that the LOCAL ADMISSION flag is set to YES or that there are no sessions currently being executed by the node which are preemptable, or after the processing node sets the LOCAL ADMISSION flag to YES at the block 426, or if the STATUS flag is set to NO as determined at the block 424, the processing node determines at a block 428 (FIG. 10) whether it is the coordinator node for the scheduling spanning tree of the arriving session.

The coordinator node determines whether its LOCAL ADMISSION flag is set to YES at a block 430. If the LOCAL ADMISSION flag of the coordinator node is set to YES (indicating that the coordinator node can support execution of the arriving session), the coordinator node transmits at a block 432 a session request to the processing nodes with which it directly communicates regarding the arriving session and which are in the scheduling spanning tree of the arriving session. The session request includes the QoS which has been requested by the user.

The coordinator node at a block 434 waits for, and receives, the responses from downstream intermediate and/or leaf nodes of the relevant scheduling spanning tree. These responses include (i) the QoS ranges that can be supported by the child nodes of the coordinator node and/or (ii) the YES or NO returns by these child nodes.

At a block 436, the coordinator node determines, based upon these responses, whether its child nodes (which, in the case of the coordinator node, are all of the other processing nodes in the scheduling spanning tree of the arriving session) can support the arriving session. More specifically, if the coordinator node receives all YES returns from the processing nodes with which it is in direct communication (the intermediate nodes 104 and 106 in the example of FIG. 4), the coordinator node determines that the arriving session can be globally supported. If the coordinator node determines at the block 436 that the child nodes can support the arriving session, the coordinator node at a block 438 adjusts the QoS of the arriving session to a QoS that is supportable of all of its child nodes. For example, if one of two possible child nodes can support the QoS range [QoSmin=CLF 3, QoSmax=CLF 0], and if the other of the two possible child nodes can support the QoS range [QoSmin=CLF 2, QoSmax=CLF 1], the coordinator node at the block 438 would select a CLF value of one for the QoS because this CLF value represents the highest QoS supportable by the two child nodes. At a block 440, the coordinator node starts the commit portion of the commit/abort phase described below in connection with FIG. 14.

On the other hand, if the coordinator node determines at the block 436 that one of its child nodes cannot support the arriving session (because the coordinator node receives a NO return from one of the processing nodes with which it is in direct communication), or if the LOCAL ADMISSION flag of the coordinator node has been set to NO as determined at the block 430, the coordinator node at a block 442 starts an abort portion of the commit/abort phase described below in connection with FIG. 15.

If a processing node determines at the block 428 that it is not the coordinator node, the processing node determines at a block 444 whether it is an intermediate node. As described above, a processing node is an intermediate node if it receives a session request from an upstream node and if it passes the received session request to one or more intermediate nodes and/or leaf nodes. The intermediate node determines at a block 446 whether its LOCAL ADMISSION flag has been set to YES by one of the blocks 418 or 426. If the LOCAL ADMISSION flag of the intermediate node has been set to YES, the intermediate node at a block 448 pushes the session request from the coordinator node to its downstream processing nodes with which it directly communicates.

The intermediate node at a block 450 waits for, is and receives, the responses from downstream intermediate and/or leaf nodes of the relevant scheduling spanning tree. These responses include (i) the QoS ranges that can be supported by the child nodes of the intermediate node and/or (ii) the YES or NO returns sent by these child nodes.

At a block 452, the intermediate node determines, based upon these responses, whether its child nodes (which, in the case of the intermediate node, are processing nodes downstream of the intermediate node in the scheduling spanning tree of the arriving session) can support the arriving session. More specifically, if the intermediate node receives all YES returns from the downstream processing nodes with which it is in direct communication (the leaf node 110 and the intermediate node 112 in the case of the intermediate node 106 in the example of Figure 4), the intermediate node determines that the arriving session can be supported. If the intermediate node determines at the block 452 that all of its child nodes can support the arriving session, the intermediate node at a block 454 adjusts the QoS of the arriving session in a manner similar to that at the block 408. At a block 456, the intermediate node also returns a YES to its parent node. The YES return includes the QoS range supportable by it and by its child nodes. For example, if an intermediate node determines that it can support a QoS range of 10–20 and if the intermediate node receives QoS ranges from its child nodes of 5–15 and 12–18, the intermediate node will return a QoS range of 12–15 to its parent node.

On the other hand, if the intermediate node determines at the block 452 that the child nodes cannot support the arriving session (because the intermediate node receives a NO return from at least one of the processing nodes with which it is in direct communication), or if its LOCAL ADMISSION flag has been set to NO, the intermediate node returns a NO to its parent node at a block 458.

If a processing node determines that it is not the coordinator node at the block 428 or an intermediate node at the block 444, the processing node must be a leaf node. When a leaf node receives a session request from an upstream processing node, it determines at a block 460 whether its LOCAL ADMISSION flag is set to YES by one of the blocks 418 or 426. If so, the leaf node at a block 462 returns a YES to its parent node. The YES includes the QoS range which the leaf node can support. On the other hand, if the LOCAL ADMISSION flag of the leaf node is set to NO, the leaf node at a block 464 returns a NO to its parent node. Accordingly, the YES and NO responses from the intermediate nodes and leaf nodes are pushed up to their parent nodes which continue to push them up to the coordinator node.

The commit portion of the commit/abort phase of the program shown in the flow charts of FIGS. 9–28 is started by the coordinator node at the block 440. The coordinator node makes the virtual shrinking and preemption real, performs the commit function during the commit portion of the commit/abort phase, and sends a commit message downstream. During the commit portion of the commit/abort phase, the intermediate nodes receive the commit message, make the virtual shrinking and preemption real, perform the commit function, and push the commit message downstream. During the commit portion of the commit/abort phase, the leaf nodes receive the commit message, make the virtual shrinking and preemption real, and perform the commit function.

Figure 14:
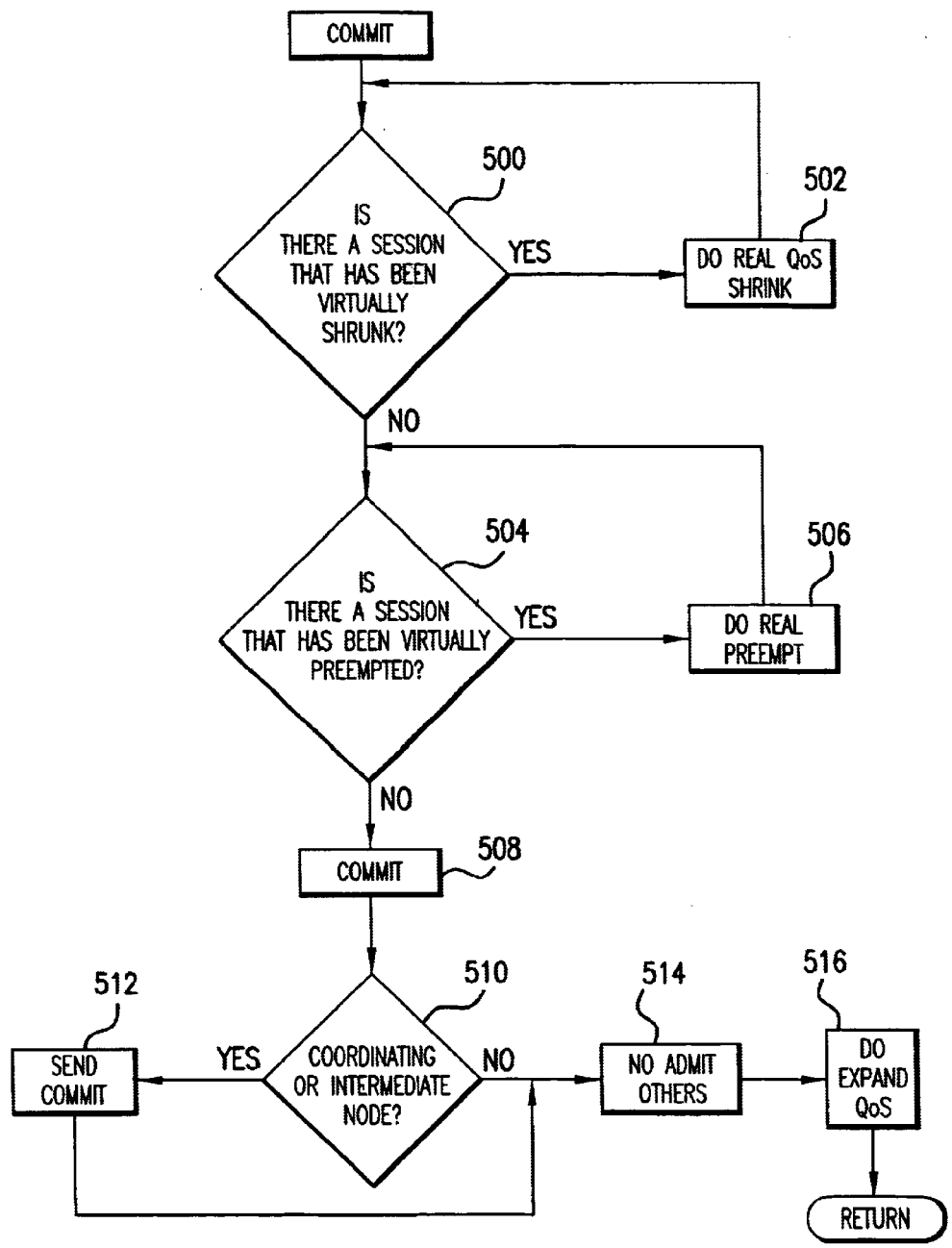

During the commit portion of the commit/abort phase as shown in FIG. 14, the processing node at a block 500 determines whether it has a session whose QoS has been virtually shrunk. These sessions are determined at the block 414 during the virtual QoS shrink routine described below in connection with FIG. 20. If there is a session whose QoS has been virtually shrunk, the processing node at a block 502 executes a real QoS shrink routine, which is described below in connection with FIG. 22, in order to make real the virtual shrinking of the QoS of that session. Flow returns to the block 500 so that, if there is another session whose QoS has been virtually shrunk, the processing node at the block 502 executes the real QoS shrink routine to make real the virtual shrinking of the QoS of that session.

When there is no remaining session whose virtual QoS shrinking can be made real, the processing node at a block 504 determines whether there is a session that has been virtually preempted. These sessions are determined at the block 422 during the virtual preempt routine described below in connection with FIG. 16. If there is a session that has been virtually preempted, the processing node at a block 506 executes a real preempt routine, which is described below in connection with FIG. 18, in order to make real the virtual preemption of that session. Flow returns to the block 504 so that, if there is another session that has been virtually preempted, the processing node at the block 506 executes the real preempt routine to make real the virtual preemption of that session.

When there is no remaining session that has been virtually preempted, the processing node at a block 508 commits the arriving session to execution. The processing node at a block 510 determines whether it is a coordinator node or an intermediate node. If the processing node is a coordinator node or an intermediate node, it sends or pushes at a block 512 a commit message downstream through the scheduling spanning tree of the arriving session so that the other processing nodes can commit to the execution of the arriving session. The commit message includes the QoS adjusted by the block 408, the block 438, or the block 454, as appropriate. That is, the QoS contained in the commit message is the maximum allowable QoS that is within the QoS ranges which are supportable by all of the nodes of the scheduling spanning tree for the arriving session and which were returned to the coordinator node during the QoS negotiation represented by FIGS. 9–13.

If the processing node is not a coordinator node or an intermediate node, or after the processing node sends or pushes the commit message downstream through the scheduling spanning tree of the arriving session, the processing node at a block 514 executes an admit others routine which is described below in connection with FIG. 24. The processing node at a block 516 also executes an expand QoS routine which expands the QoS's of all sessions whose QoS's were shrunk.

These QoS's are expanded to the extent possible as determined by applicable resource constraints, such as the resource constraints established by the equations (7), (8), (10), (12), and (13). Also, these QoS's are expanded according to a policy selected by the system administrator. For example, in order to reduce overhead of the global resource manager 14 and to reduce system wide resource consumption, the QoS's of sessions may be expanded in order of the size of the current scheduling spanning trees, with the QoS's of sessions of the smallest current scheduling spanning trees being expanded first. Alternatively, the QoS's of randomly selected sessions may be expanded first. As a further alternative, in order to provide better QoS's for high criticality sessions, the QoS's of sessions may be expanded in order of criticality, with the QoS's of the sessions having the highest criticality being expanded first.

Figure 15:
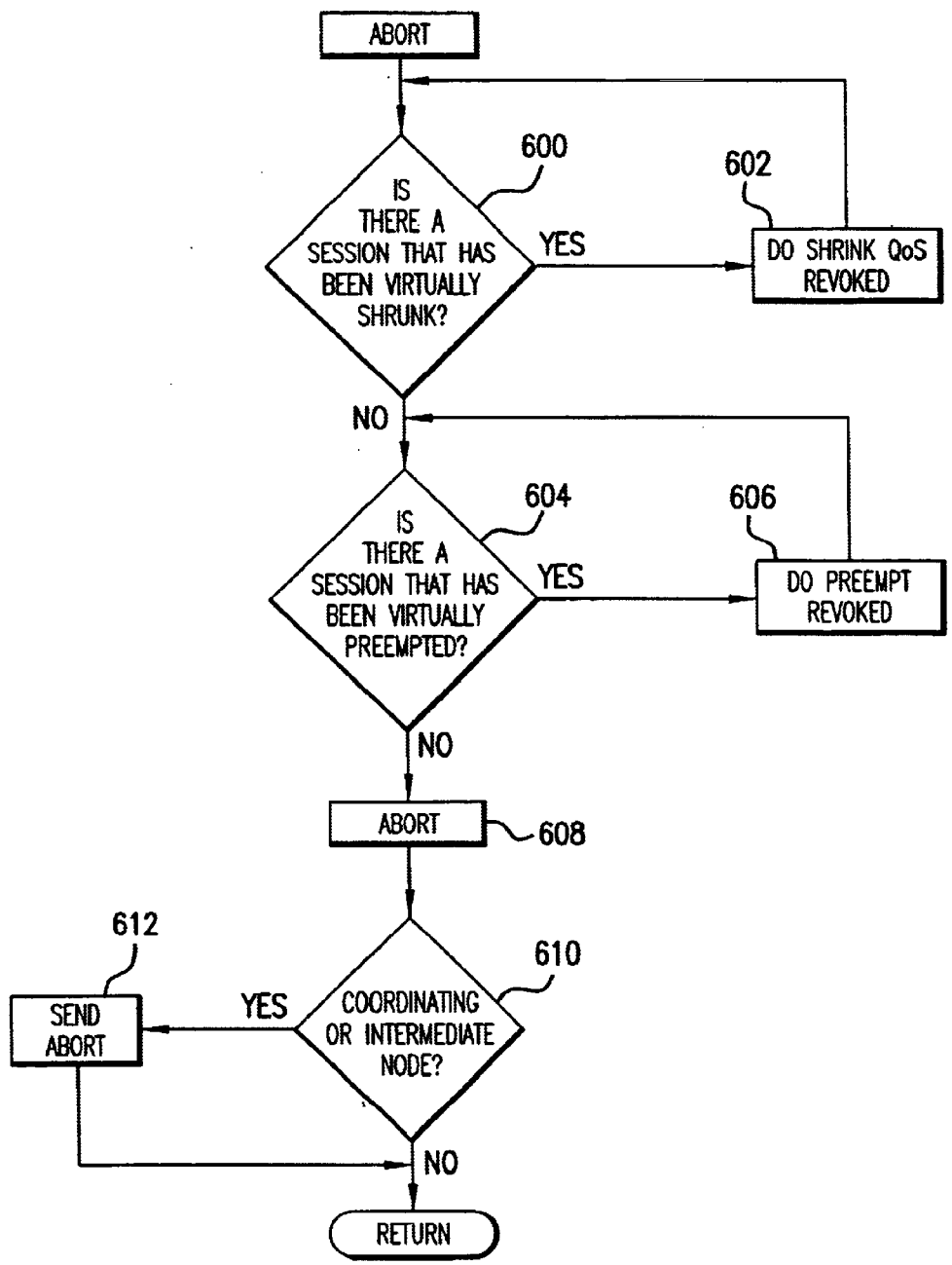

During the abort portion of the commit/abort phase as shown in FIG. 15, the processing node at a block 600 determines whether there is a session whose QoS has been virtually shrunk. These sessions are determined at the block 414 during the virtual QoS shrink routine described below in connection with FIG. 20. If there is a session whose QoS has been virtually shrunk, the processing node at a block 602 executes a shrink QoS revoked routine, which is described below in connection with FIG. 23, in order to revoke the virtual shrinking of the QoS of that session. Flow returns to the block 600 so that, if there is another session whose virtual shrinking of its QoS can be revoked, the processing node:at the block 602 executes the shrink QoS revoked routine to revoke the virtual QoS shrinking of the QoS of that session also. In essence, the QoS shrink revoke routine revokes the virtual QoS shrinking that was done during execution of the virtual QoS shrink routine.

After the shrink QoS revoked routine has been executed for each of the sessions whose QoS has been virtually shrunk, the processing node at a block 604 determines whether there is a session that has been virtually preempted. If there is a session that has been virtually preempted, the processing node at a block 606 executes a preempt revoked routine, which is described below in connection with FIG. 19, in order to revoke the virtual preempting of that session that was done at the block 422. Flow returns to the block 604 so that, if there is another session whose virtual preempting can be revoked, the processing node at the block 606 executes the preempt revoked routine to revoke the preemption of that session also. In essence, the preempt revoke routine revokes the virtual preemption that was done during execution of the virtual preempt routine.

When there is no session whose virtual preemption can be revoked, the processing node at a block 608 aborts the execution of the arriving session. The processing node at a block 610 determines whether it is a coordinator node or an intermediate node. If the processing node is a coordinator node or an intermediate node, it sends or pushes at a block 612 an abort message downstream through the scheduling spanning tree of the arriving session so that the other nodes of this scheduling spanning tree can also perform the functions of the blocks 600–608.

Figure 16:
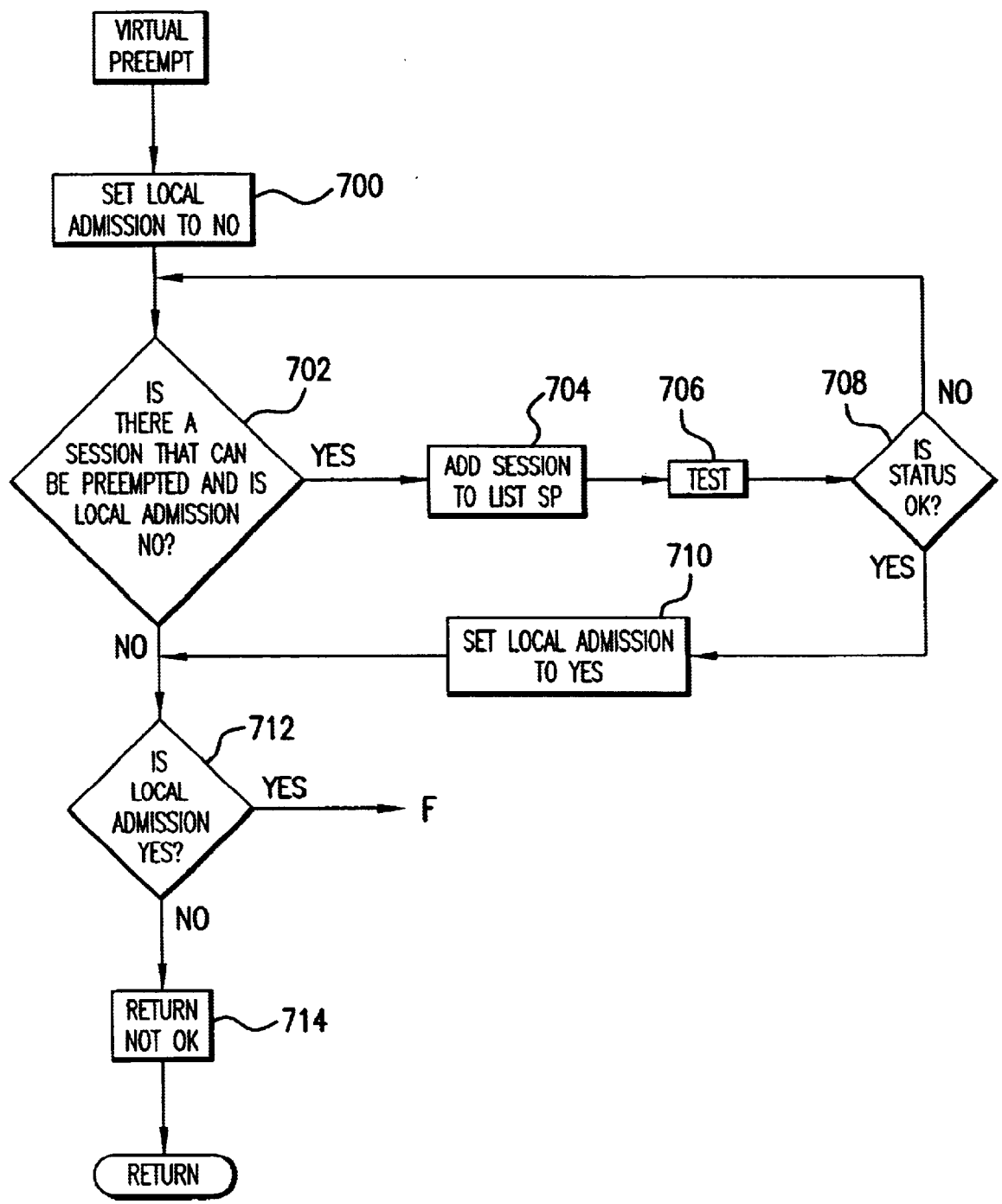
Figure 17:
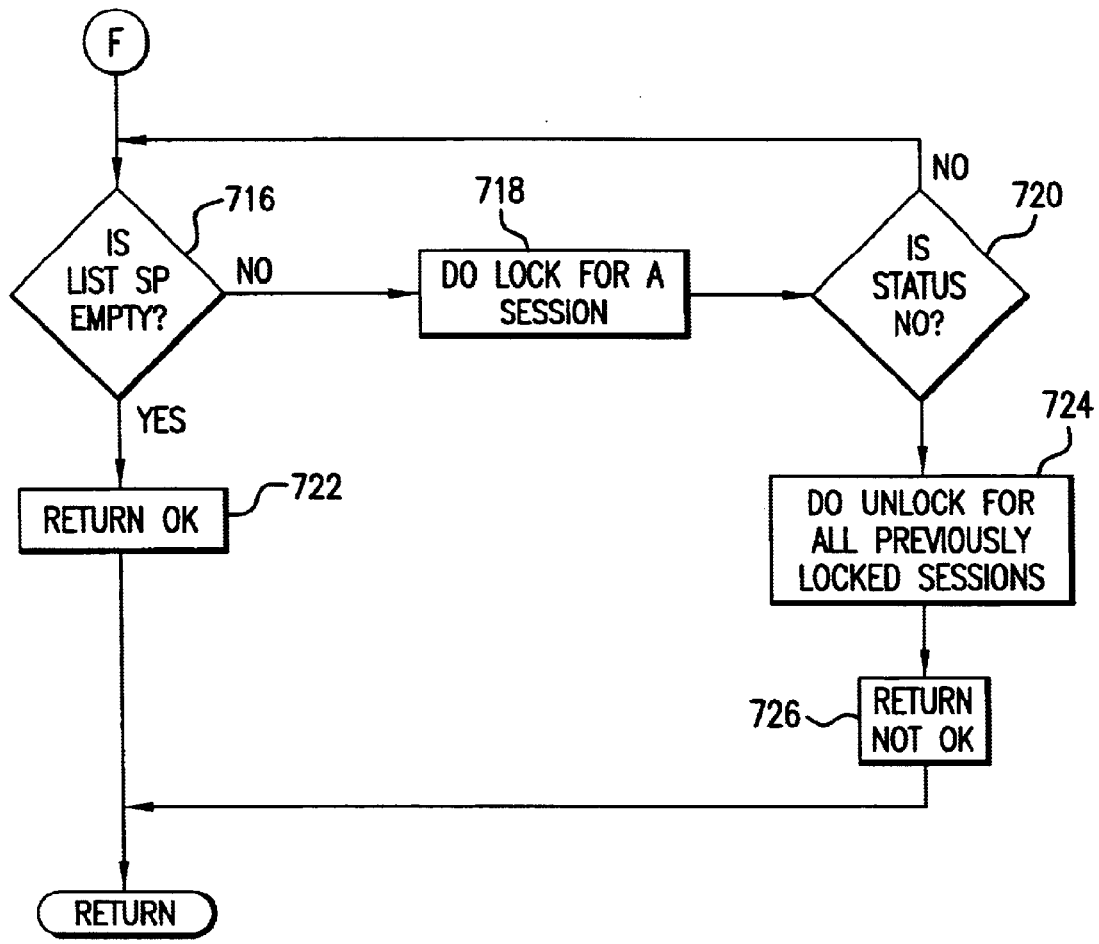

The virtual preempt routine is invoked at the block 422 and is shown in FIG. 16. In this routine, the processing node at a block 700 sets its LOCAL ADMISSION flag to NO. At a block 702, the processing node determines whether there is a session that can be preempted and whether the LOCAL ADMISSION flag is set to NO. Sessions having assigned criticalities that are lower than the assigned criticality of the arriving session are preemptable. Of the sessions having assigned criticalities that are lower than the assigned criticality of the arriving session, sessions having the lowest assigned criticality may be preempted first. As described above, a tie breaker may be chosen as a policy matter by the system administrator.

If there is a session that can be preempted, the session having the lowest assigned criticality is virtually preempted and is added to a session preemption list SP at a block 704. The processing node at a block 706 conducts a test, such as a test according to the resource constraints established at the equations (7), (8), (10), (12), and (13). That is, the processing node subtracts the resource requirements of the pre-empted session from the left sides of these equations and determines if the left sides now meet the criteria established by the right sides. If the preemption of this session is not sufficient to satisfy applicable resource constraints, such as the resource constraints established by equations (7), (8), (10), (12), and (13), a STATUS flag is not set to OK. On the other hand, if the preemption of this session is sufficient to satisfy the applicable resource constraints, such as the resource constraints established by equations (7), (8), (10), (12), and (13), the STATUS flag is set to OK.

The processing node determines at a block 708 whether its STATUS flag is set to OK. If not, flow returns to the block 702 where the processing node again determines whether there is a session that can be preempted and whether the LOCAL ADMISSION flag of the processing node is set to NO. If so, another preemptable session is added to the session preemption list SP at the block 704, the test at the block 706 is performed, and so on.

Two outcomes from the processing at the blocks 702–708 can result. In one outcome, there are not enough preemptable sessions that can be preempted to free up sufficient resources to permit execution of the arriving session. In other words, the sessions having assigned criticalities higher than the assigned criticality of the arriving session are using up all of the resources of the processing node. In this outcome, the block 702 determines that there are no more preemptable sessions before the block 708 determines that the STATUS flag is set to OK. Accordingly, the LOCAL ADMISSION flag remains at NO.

In the other outcome, there are enough preemptable sessions that can be preempted to free up sufficient resources to permit execution of the arriving session. In other words, the arriving session and all sessions having assigned criticalities higher than the assigned criticality of the arriving session will not use more resources than are available at the processing node. In this outcome, the block 708 determines that the STATUS flag is set to OK before the block 702 determines that there are no more preemptable sessions. Accordingly, the processing node at a block 710 sets its LOCAL ADMISSION flag to YES.

The processing node at a block 712 determines whether its LOCAL ADMISSION flag remains at NO or has been set to YES at the block 710. If the processing node determines that its LOCAL ADMISSION flag remains at NO, the processing node at a block 714 returns a not OK to the block 424 which, because the LOCAL ADMISSION flag of the processing node is still set to NO, means that if the processing node is a coordinator node, it starts the abort routine at the block 442, and if the processing node is an intermediate node or a leaf node, it returns a NO to its parent at the blocks 458 and 464, as appropriate.

Figure 25:
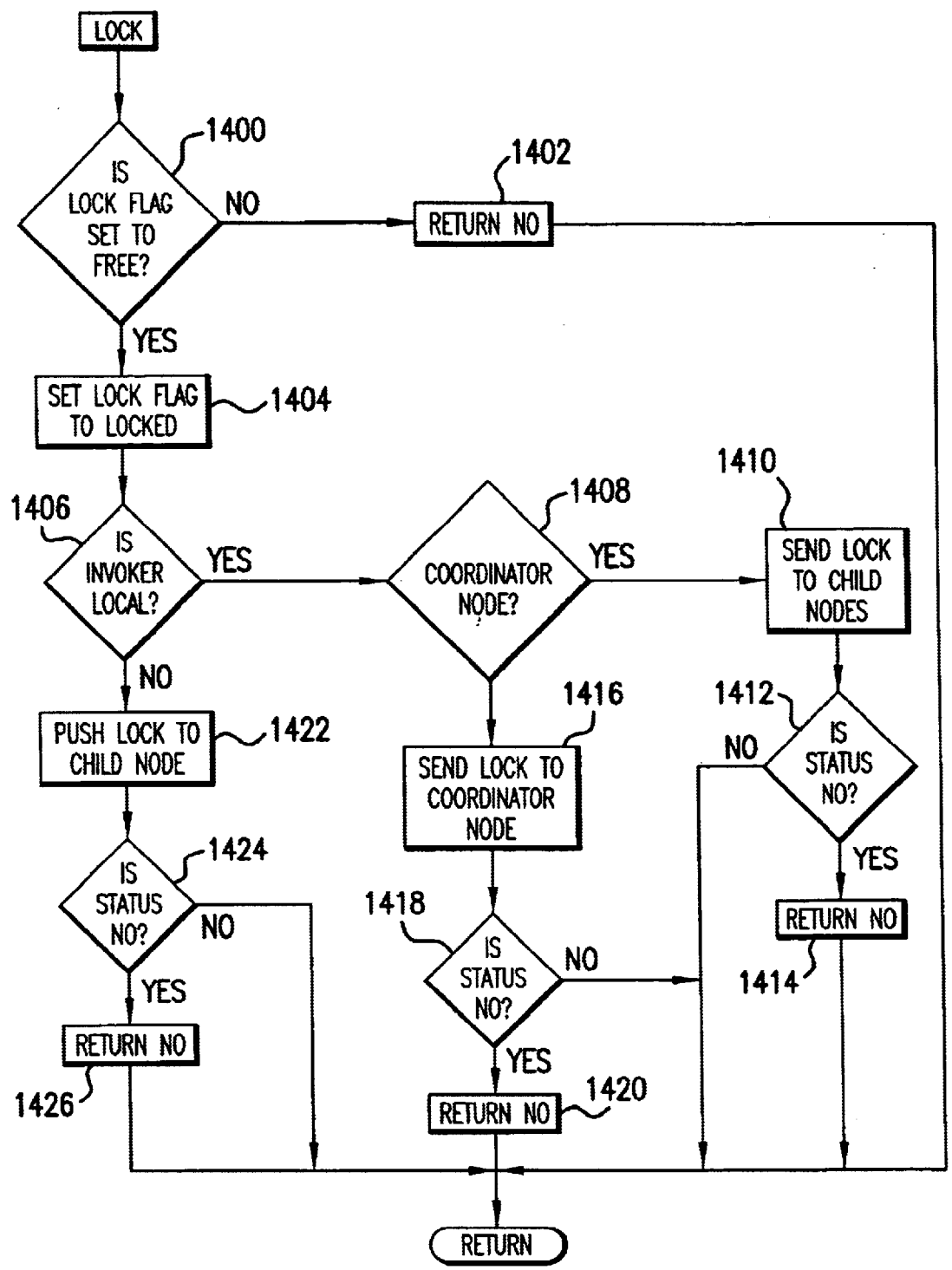

On the other hand, if the processing node determines that its LOCAL ADMISSION flag is set to YES at the block 710, the processing node at a block 716 determines if the session preemption list SP is empty. If the session preemption list SP is not empty, the processing node at a block 718 executes a lock routine for a session of the session preemption list SP. The lock routine is shown in FIG. 25. In this routine, the processing node attempts to lock the session being processed so that other sessions cannot affect its virtual preemption status. If the lock routine returns an OK for this session as determined by the processing node at a block 720, and if the session preemption list SP is not empty, the processing node at the block 718 executes the lock routine for another session of the session preemption list SP. If the lock routine returns an OK for this session, flow again returns to the block 716.

Two outcomes from the processing at the blocks 716–720 can result. In one outcome, all sessions of the session preemption list SP are successfully locked. In this outcome, the block 716 determines that the session preemption list SP is empty before the block 720 determines that the STATUS flag is set to NO (i.e., not OK) so that the processing node at a block 722 returns an OK to the block 424.

In the other outcome, all sessions of the session preemption list SP are not successfully locked. In this outcome, the block 720 determines that the STATUS flag is set to NO before the block 716 determines that the session preemption list SP is empty. Accordingly, the processing node at a block 724 executes an unlock routine, which is described below in connection with FIG. 26, in order to unlock all of the sessions locked at the block 718, and the processing node at a block 726 returns a not OK to the block 424.

Figure 18:
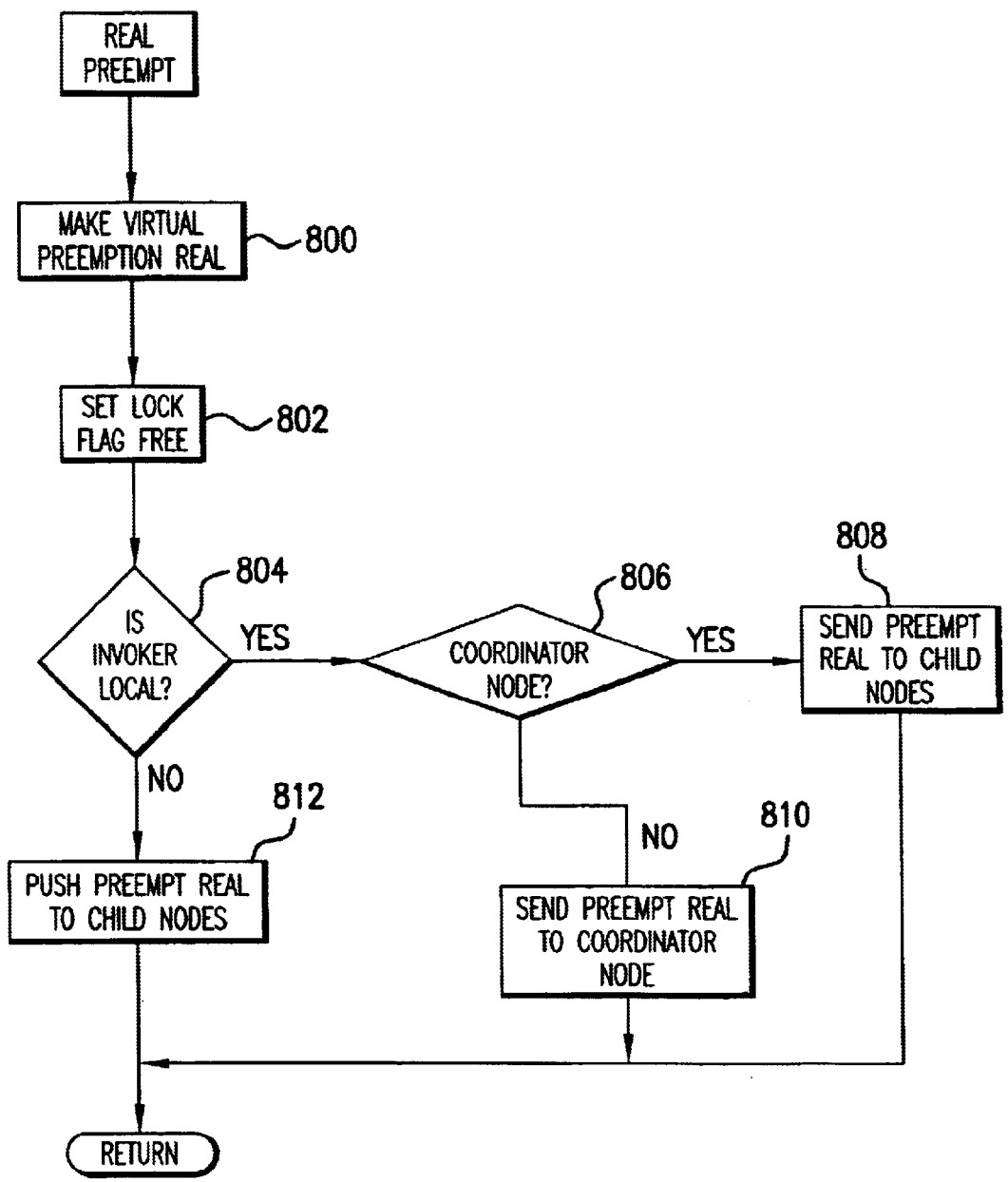

The real preempt routine is invoked at the block 506 and is shown in FIG. 18. At a block 800, the processing node makes real the virtual preemption of a session. That is, the processing node actually preempts a session which was only virtually preempted at the block 422. The processing node at a block 802 sets the LOCK flag for this session to FREE. At a block 804, the processing node determines whether it invoked the real preempt routine itself or whether it received an invoke real preempt message from another processing node. If the real preempt routine was invoked locally, the processing node determines at a block 806 whether it is the coordinator node for the scheduling spanning tree of the arriving session. If the processing node is the coordinator node, the processing node at a block 808 sends an invoke real preempt message to its child nodes which causes the child nodes to invoke the real preempt routine of FIG. 18 for the session whose virtual preemption is being made real. If the processing node is not the coordinator node, the processing node at a block 810 sends an invoke real preempt message to its coordinator node which causes the coordinator node to invoke the real preempt routine of FIG. 18 and to propagate the invoke real preempt message to its child nodes so that the virtual shrinking of the QoS of the session being processed can be made real by the entire relevant scheduling spanning tree. If the real preempt routine was not invoked locally as determined at the block 804, the processing node at a block 812 pushes a received invoke real preempt message to its child nodes which causes the child nodes to invoke the real preempt routine of FIG. 18 for the session whose virtual preemption is being made real. After the processing node at the blocks 808 or 812 sends or pushes an invoke real preempt message to its child nodes, or after the processing node at the block 810 sends an invoke real preempt message to its coordinator node, program flow returns to the block 504 to determine if there is another session to be processed by the real preempt routine.

Figure 19:
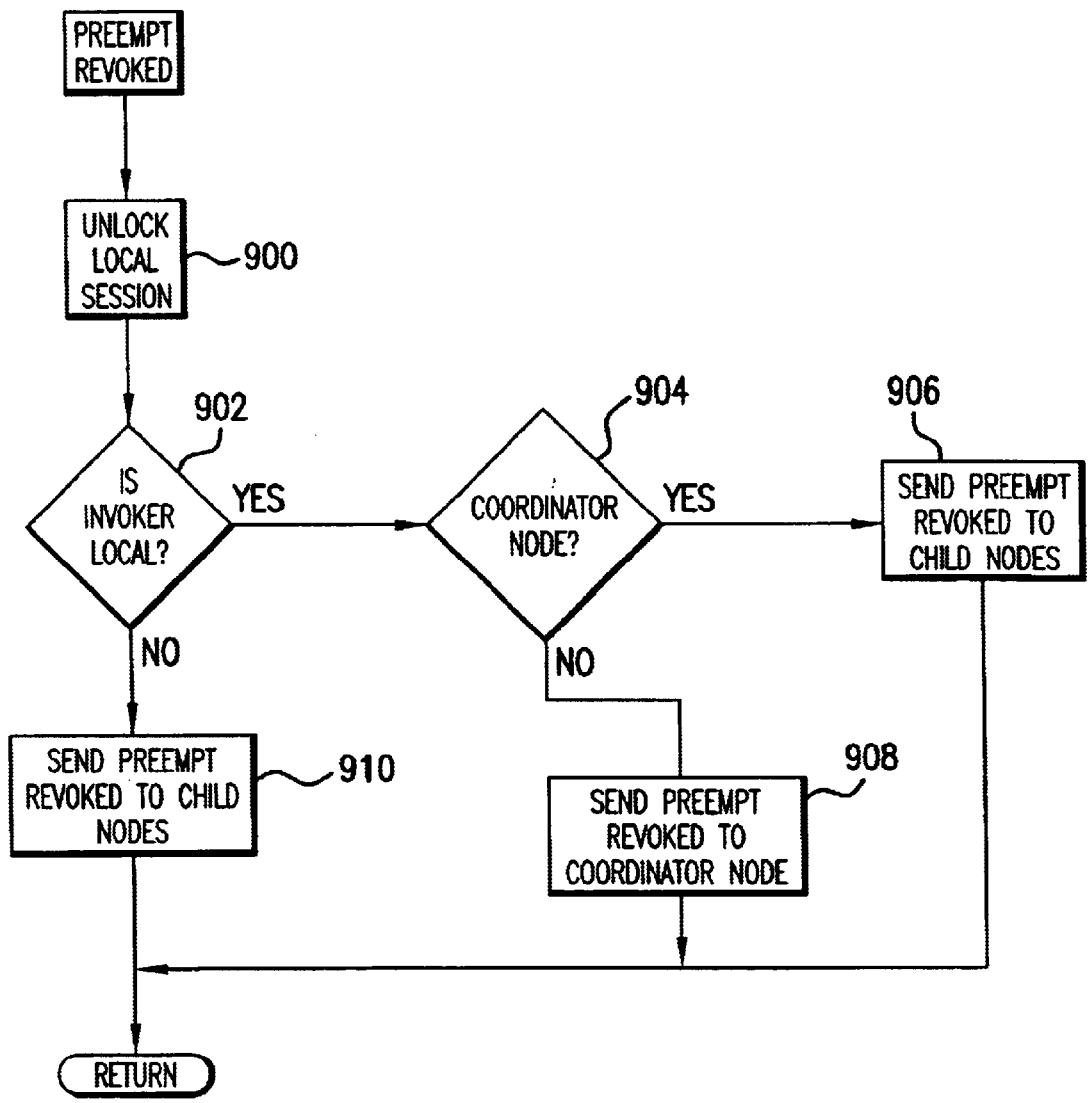

The preempt revoked routine is invoked at the block 606 and is shown in FIG. 19. At a block 900, the processing node unlocks one of its local sessions so that this local session may be locked by sessions other than the arriving session, as necessary. This local session is unlocked by setting its LOCK flag to FREE. Also, the virtual preemption of this session is revoked. At a block 902, the processing node determines whether it invoked the preempt revoked routine itself or whether it received an invoke preempt revoked message from another processing node. If the preempt revoked routine was invoked locally, the processing node determines at a block 904 whether it is the coordinator node for the scheduling spanning tree of the arriving session. If the processing node is the coordinator node, the processing node at a block 906 sends an invoke preempt revoked message to its child nodes which causes the child nodes to invoke the preempt revoked routine of FIG. 19 for the session being processed. If the processing node is not the coordinator node, the processing node at a block 908 sends an invoke preempt revoked message to its coordinator node which causes the coordinator node to invoke the preempt revoked routine of FIG. 19 and to propagate the invoke preempt revoked message to its child nodes in order to revoke the preemption of the session being processed. If the preempt revoked routine was not invoked locally as determined at the block 902, the processing node at a block 910 pushes a received invoke preempt revoked message to its child nodes which causes the child nodes to invoke the preempt revoked routine of FIG. 19. After the processing node at the blocks 906 or 910 sends or pushes an invoke preempt revoked message to its child nodes, or after the processing node at the block 908 sends an invoke preempt revoked message to its coordinator node, program flow returns to the block 604.

Figure 20:
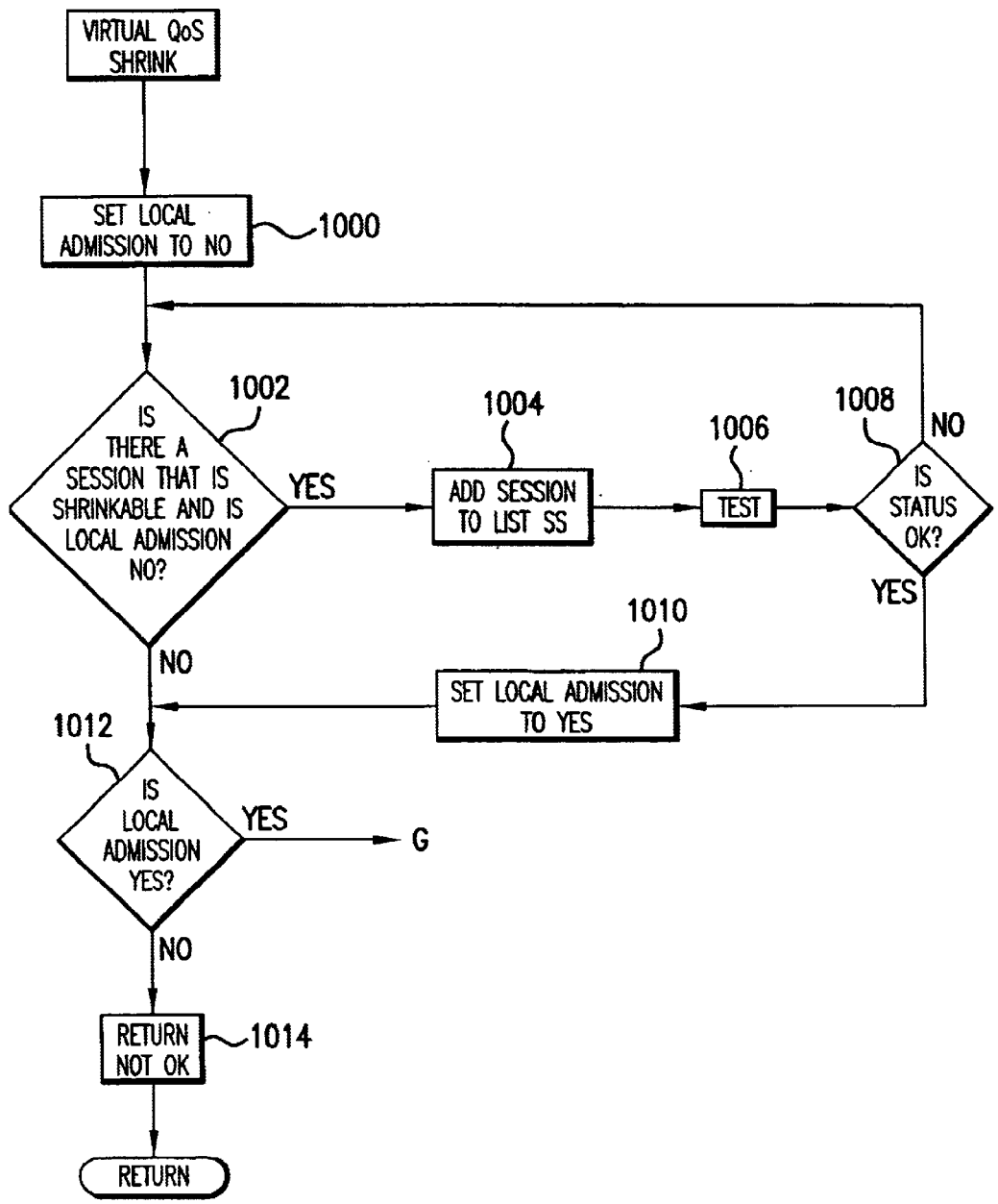
Figure 21:
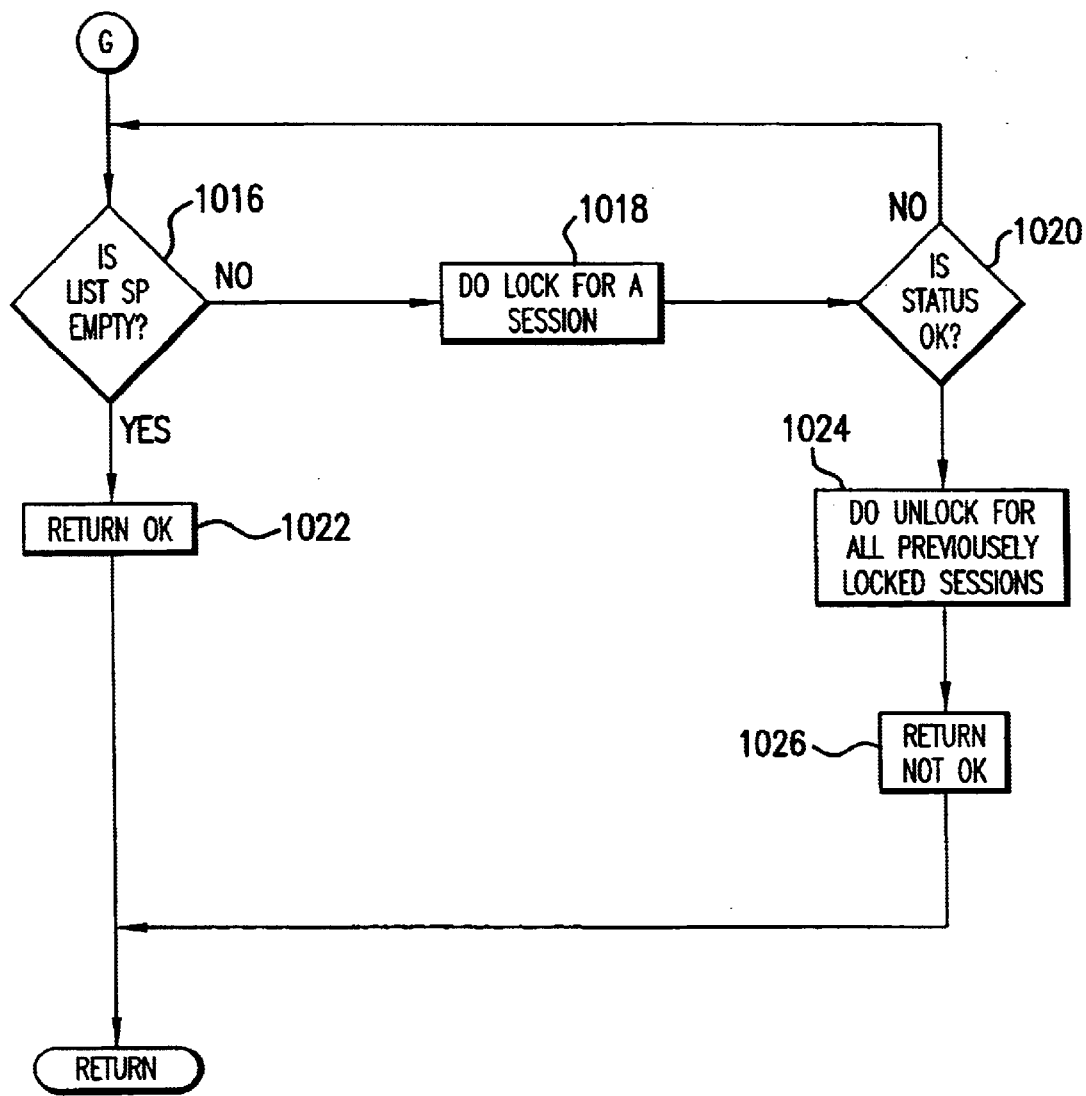

The virtual QoS shrink routine is invoked at the block 414 and is shown in FIG. 20. In this routine, the processing node at a block 1000 sets its LOCAL ADMISSION flag to NO. At a block 1002, the processing node determines whether there is a session whose QoS is shrinkable and whether the LOCAL ADMISSION flag of the processing node is set to NO. Sessions have shrinkable QoS's if their QoS's are not already at their minimums. As described above, which sessions are selected to have their QoS's shrunk is a policy matter for the system administrator.

If there is a session whose QoS can be shrunk, the QoS of that session is shrunk and that session is added to a session shrink list SS at a block 1004. The processing node at a block 1006 conducts a test, such as a test according to the criteria established at the equations (7), (8), (10), (12), and (13). That is, after the processing node shrinks the QoS of the session added to the session shrink list SS, the processing node recomputes the resource requirements of the executing sessions as indicated by the left sides of these equations and determines if the left sides now meet the criteria established by the right sides. If the shrinking of the QoS of this added session is not sufficient to satisfy the applicable resource constraints, such as the resource constraints of equations (7), (8), (10), (12), and (13), a STATUS flag is not set to OK. On the other hand, if the shrinking of the QoS of this session is sufficient to satisfy the applicable resource constraints, such as the resource constraints of equations (7), (8), (10), (12), and (13), the STATUS flag is set to OK.

The processing node determines at a block 1008 whether its STATUS flag is set to OK. If not, flow returns to the block 1002 where the processing node again determines whether there is a session whose QoS is shrinkable and whether the LOCAL ADMISSION flag of the processing node is set to NO. If so, another session whose QoS is shrinkable is added to the session shrink list SS at the block 1004, its QoS is shrunk, the test at the block 1006 is performed, and so on.

Two outcomes from the processing at the blocks 1002–1008 can result. In one outcome, there are not enough shrinkable sessions whose QoS's can be shrunk to free up sufficient resources to permit execution of the arriving session. In this outcome, the block 1002 determines that there are no more shrinkable sessions before the block 1008 determines that the STATUS flag is set to OK so that the LOCAL ADMISSION flag remains at NO.

In the other outcome, there are enough shrinkable sessions whose QoS's can be shrunk to free up sufficient resources to permit execution of the arriving session. In this outcome, the block 1008 determines that the STATUS flag is set to OK before the block 1002 determines that there are no more sessions whose QoS's can be shrunk. Accordingly, the processing node at a block 1010 sets its LOCAL ADMISSION flag to YES.

The processing node at a block 1012 determines whether its LOCAL ADMISSION flag remains at NO or has been set to YES at the block 1010. If the processing node determines that its LOCAL ADMISSION flag remains at NO, the processing node at a block 1014 returns a not OK to the block 416 which, because the LOCAL ADMISSION flag of the processing node is still set to NO, means that the processing node will not attempt virtual preemption.

On the other hand, if the processing node at the block 1012 determines that its LOCAL ADMISSION flag is set to YES at the block 1010, the processing node at a block 1016 determines if the session shrink list SS is empty. If the session shrink list SS is not empty, the processing node at a block 1018 executes the lock routine of FIG. 25 for a session of the session shrink list SS. Accordingly, the processing node attempts to lock the session being processed so that other sessions cannot affect its QoS. If the lock routine returns a status of OK for this session as determined by the processing node at a block 1020, the processing node at the block 1016 again determines if the session shrink list SS is empty. If the session shrink list SS is not empty, the processing node at the block 1018 executes the lock routine for another session of the session shrink list SS, the block 1020 determines if the status returned by the lock routine is OK, and so on.

Two outcomes from the processing at the blocks 1016–1020 can result. In one outcome, all sessions of the session shrink list SS are successfully locked. In this outcome, the block 1016 determines that the session shrink list SS is empty before the block 1020 determines that the STATUS returned by the lock routine is set to not OK. Accordingly, the processing node at a block 1022 returns an OK to the block 416.

In the other outcome, all sessions of the session shrink list SS are not successfully locked. In this outcome, the block 1020 determines that the STATUS returned by the lock routine is not OK before the block 1016 determines that the session shrink list SS is empty. Accordingly, the processing node at a block 1024 unlocks all of the sessions locked at the block 1018, and the processing node at a block 1026 returns a not OK to the block 416.

Figure 22:
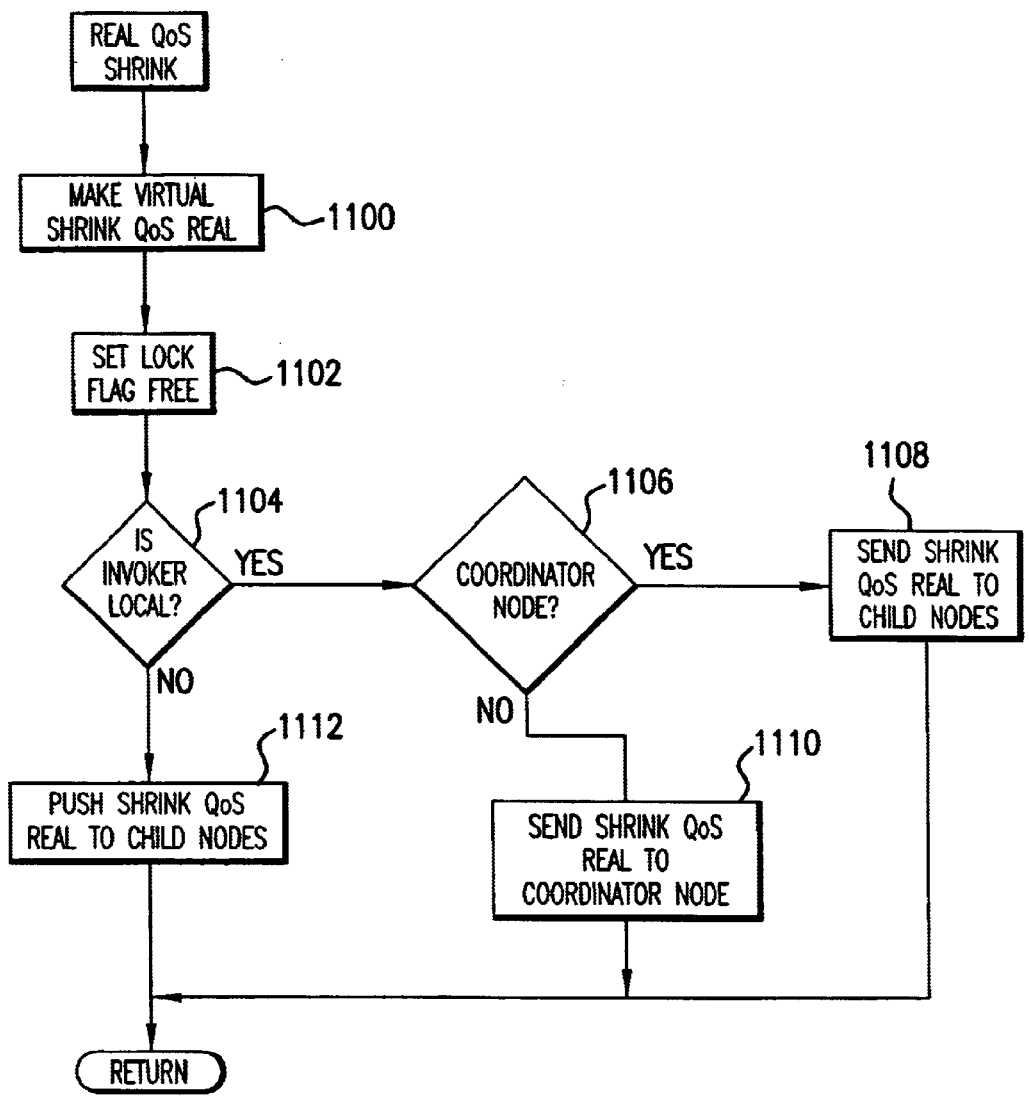

The real QoS shrink routine is invoked at the block 502 and is shown in FIG. 22. At a block 1100, the processing node makes the virtual QoS shrinking of a session real. That is, the processing node actually shrinks the QoS of a session whose QoS was only virtually shrunk at the block 414. The processing node at a block 1102 sets the LOCK flag of the session to FREE. At a block 1104, the processing node determines whether it invoked the real QoS shrink routine itself or whether it received an invoke real QoS shrink message from another processing node. If the real QoS shrink routine was invoked locally, the processing node determines at a block 1106 whether it is the coordinator node for the scheduling spanning tree of the arriving session. If the processing node is the coordinator node, the processing node at a block 1108 sends an invoke real QoS shrink message to its child nodes which causes the child nodes to invoke the real QoS shrink routine of FIG. 22 for the session. If the processing node is not the coordinator node, the processing node at a block 1110 sends an invoke real QoS shrink message to its coordinator node which causes the coordinator node to invoke the real QoS shrink routine of FIG. 22 for the session and to propagate the invoke real QoS shrink message to its child nodes so that the virtual QoS of the session can be made real by, all of the nodes of the relevant scheduling spanning tree. If the real QoS shrink routine was not invoked locally as determined at the block 1104, the processing node at a block 1112 pushes a received invoke real QoS shrink message to its child nodes which causes the child nodes to invoke the real QoS shrink routine of FIG. 22 for the session. After the processing node at the blocks 1108 or 1112 sends or pushes an invoke real QoS shrink message to its child nodes, or after the processing node at the block 1110 sends an invoke real QoS shrink message to its coordinator node, program flow returns to the block 500 to determine if there is another session whose virtual shrinking can be made real.

Figure 23:
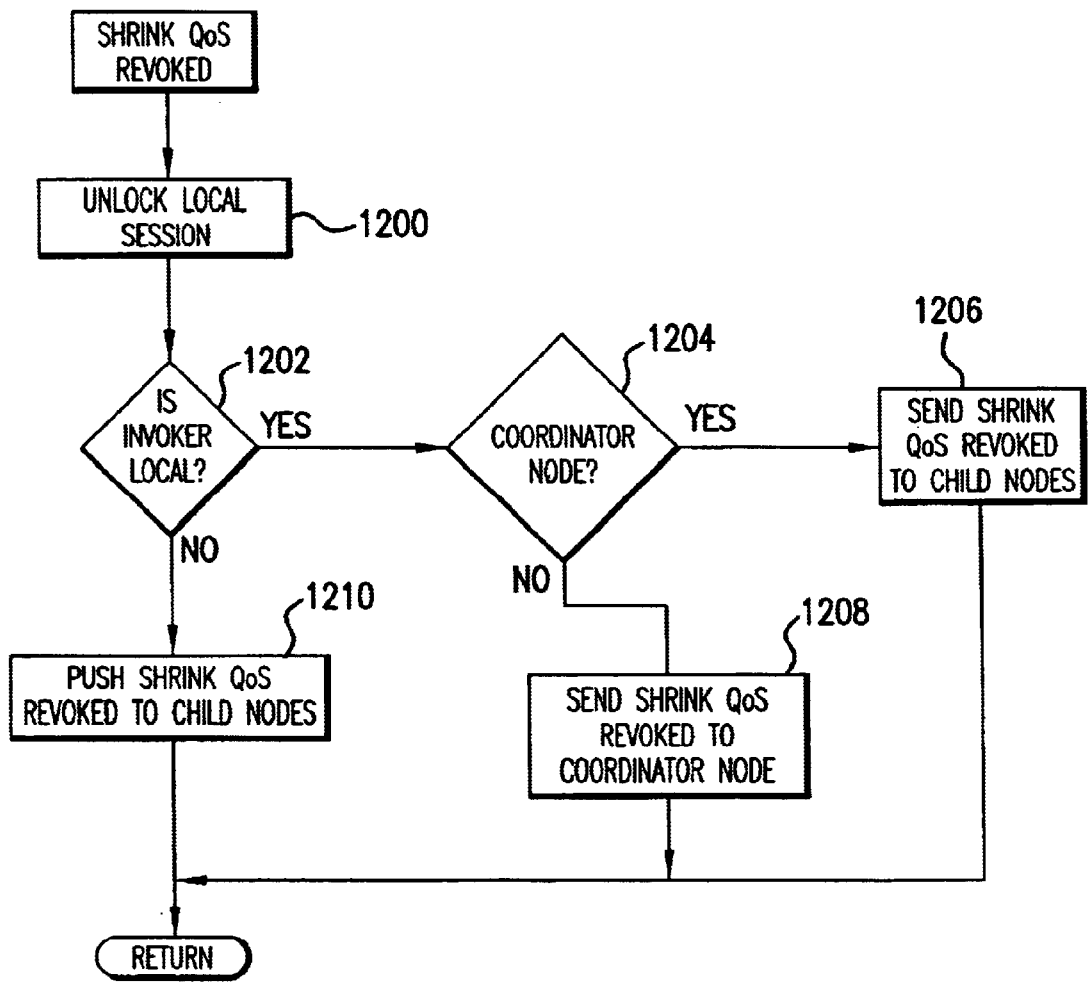

The shrink QoS revoked routine is invoked at the block 602 and is shown in FIG. 23. At a block 1200, the processing node unlocks one of its local sessions so that this local session may be locked by sessions other than the arriving session, as necessary. This local session is unlocked by setting its LOCK flag to FREE. Also, the virtual shrinking of the QoS of the session is revoked. At a block 1202, the processing node determines whether it invoked the shrink QoS revoked routine itself or whether it received an invoke shrink QoS revoked message from another processing node. If the shrink QoS revoked routine was invoked locally, the processing node determines at a block 1204 whether it is the coordinator node for the scheduling spanning tree of the arriving session. If the processing node is the coordinator node, the processing node at a block 1206 sends an invoke shrink QoS revoked message to its child nodes which causes the child nodes to invoke the shrink QoS revoked routine of FIG. 23 for the session. If the processing node is not the coordinator node, the processing node at a block 1208 sends an invoke shrink QoS revoked message to its coordinator node which causes the coordinator node to invoke the shrink QoS revoked routine of FIG. 23 for the session and to propagate the invoke shrink QoS revoked message to its child nodes so that the virtual shrinking of the QoS of the session can be revoked by all of the nodes of the relevant scheduling spanning tree. If the preempt revoked routine was not invoked locally as determined at the block 1202, the processing node at a block 1210 pushes a received invoke shrink QoS revoked message to its child nodes which causes the child nodes to invoke the shrink QoS revoked routine of FIG. 23 for the session. After the processing node at the blocks 1206 or 1210 sends or pushes an invoke shrink QoS revoked message to its child nodes, or after the processing node at the block 1208 sends an invoke shrink QoS revoked message to its coordinator node, program flow returns to the block 600 to determine if there is another session whose virtual QoS shrinking should be revoked.

Figure 24:
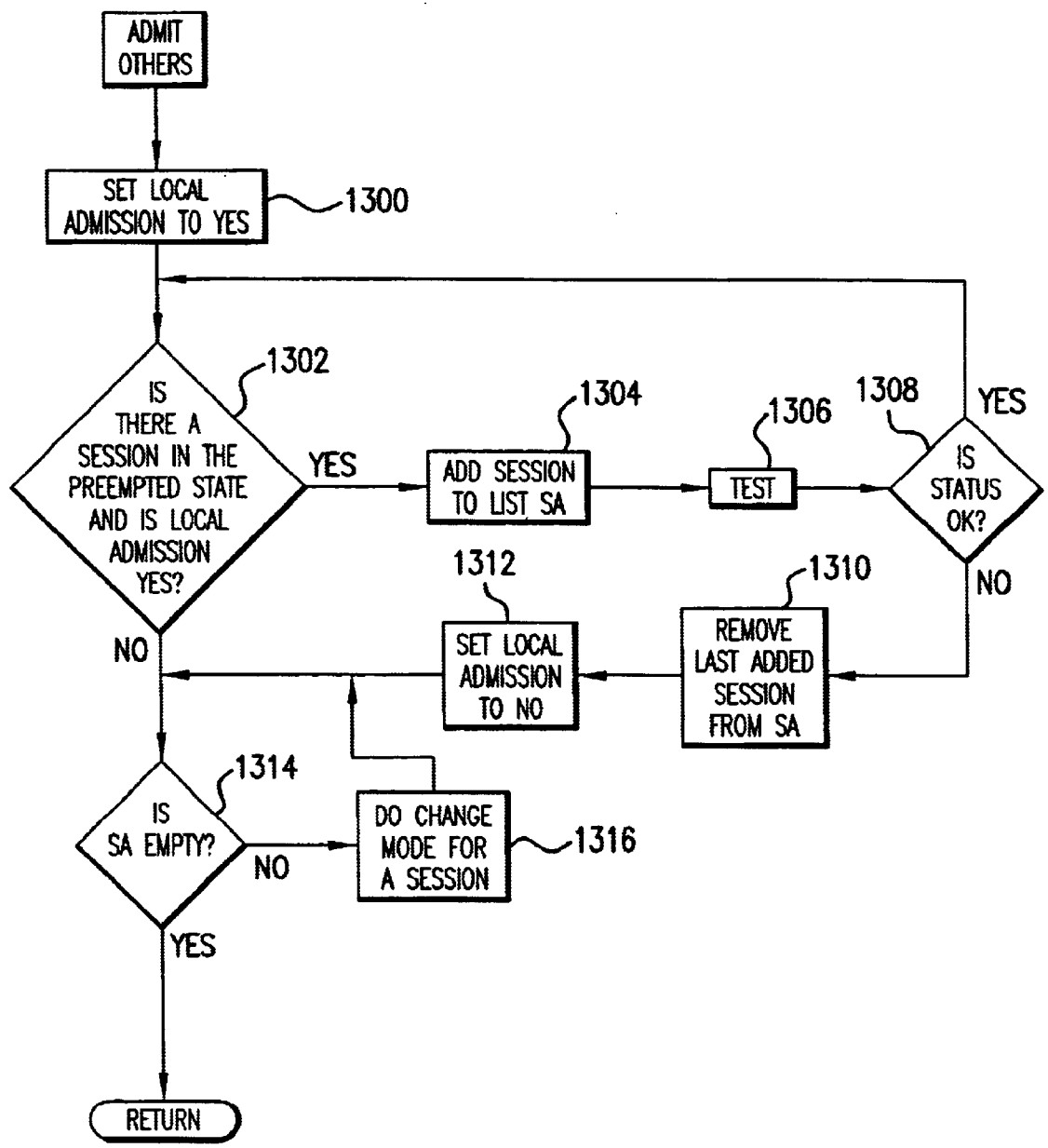

The admit others routine is invoked at the block 514 and is shown in FIG. 24. In this routine, the processing node at a block 1300 sets its LOCAL ADMISSION flag to YES. At a block 1302, the processing node determines whether there is a session in a preempted state and whether the LOCAL ADMISSION flag of the processing node is set to YES. If there is a session in the preempted state, that session is added at a block 1304 to a session admit list SA. The admit others routine readmits sessions, for example according to their criticality, with sessions having the highest assigned criticality being readmitted first. However, in the case of ties (where tying sessions have the same assigned criticality), a tie breaker may be used to decide which of the sessions to readmit. A tie breaker may be chosen as a policy matter by the system administrator. For example, in order to reduce overhead of the global resource manager 14 and to discourage long running applications, sessions may be readmitted in order of the size of the current scheduling spanning trees, with sessions of the smallest current scheduling spanning trees being readmitted first. Alternatively, in order to discourage long running applications, sessions may be readmitted in order of running time, with the shortest running sessions being readmitted first. As a further alternative, sessions may be readmitted in a random order.

The admit others routine is executed because, after QoS shrinking and session preemption at the blocks 502 and 506, enough resources may have been freed up to readmit other sessions from the session preemption list SP which require less resources than the preempted session(s). Accordingly, the processing node at a block 1306 conducts a test according to the applicable resource constraints, such as the resource constraints established at the equations (7), (8), (10), (12), and (13), in order to determine if the readmission of the session added to the session admit list SA has caused the resources of the processing node to be exceeded. If the readmission of this session has not caused the resources of the processing node to be exceeded, the test returns a STATUS of OK. On the other hand, if the readmission of this session has caused the resources of the processing node to be exceeded; the test returns a STATUS of not OK.

The processing node determines at a block 1308 whether the test returned a STATUS of OK. If so, flow returns to the block 1302 where the processing node again determines whether there is a session in the preempted state and whether the LOCAL ADMISSION flag of the processing node is set to YES. If so, another session in the preempted state is added to the session admit list SA at the block 1304, the test at the block 1306 is performed, and so on.

Two outcomes from the processing at the blocks 1302–1308 can result. In one outcome, all of the sessions in the preempted state can be readmitted. In this outcome, the block 1302 determines that there are no more sessions in the preempted state before the block 1308 determines that the STATUS returned by the test is not OK.

In the other outcome, less than all of the sessions in the preempted state can be readmitted. In this outcome, the block 1308 determines that the STATUS is not OK before the block 1302 determines that there are no more sessions in the preempted state. Accordingly, the processing node at a block 1310 removes the last added session from the session admit list SA, and the processing node at a block 1312 sets its LOCAL ADMISSION flag to NO.

If the block 1302 determines that there are no more sessions in the preempted state before the block 1308 determines that the STATUS returned by the test is not OK, or after the processing node at a block 1312 sets its LOCAL ADMISSION flag to NO, the processing node at a block 1314 determines whether the session admit list SA is empty. If the session admit list SA is not empty, the processing node at a block 1316 executes a change mode routine described below in connection with FIG. 27 for a session on the session admit list SA. The blocks 1314 and 1316 are executed until the session admit list SA is empty at which point program flow returns to the block 516.

The lock routine is invoked at the blocks 718 and 1018, and is shown in FIG. 25. At a block 1400, the processing node determines whether a LOCK flag for a session has been set to FREE so that this session may be locked by the arriving session. This session may be locked by an arriving session of another scheduling spanning tree so that its LOCK flag is set to LOCKED at the block 718 during execution of the virtual preempt routine of FIGS. 16 and 17 and/or at the block 1018 during execution of the virtual QoS shrink routine of FIGS. 19 and 20. On the other hand, the LOCK flag is set to FREE at the block 802 during execution of the real preempt routine of FIG. 18 and at the block 1102 during execution of the real QoS shrink routine of FIG. 22.

If the processing node at the block 1400 determines that the LOCK flag of a session is not set to FREE (because the session has been locked by an arriving session of another scheduling spanning tree), the processing node at a block 1402 returns a NO to the block 720 or to the block 1020, as appropriate. However, if the processing node at the block 1400 determines that the LOCK flag of a session is set to FREE (so that the session can be locked by the arriving session of the current scheduling spanning tree), the processing node at a block 1404 sets the LOCK flag of the session to LOCKED. At a block 1406, the processing node determines whether it invoked the lock routine itself or whether it received an invoke lock message from another processing node. If the lock routine was invoked locally, the processing node determines at a block 1408 whether it is the coordinator node for the scheduling spanning tree of the arriving session. If the processing node is the coordinator node, the processing node at a block 1410 sends an invoke lock message to its child nodes which causes the child nodes to invoke the lock routine of FIG. 25 for the session. The child nodes, therefore, execute the lock routine of FIG. 25. The processing node determines at a block 1412 whether the child nodes returned a NO indicating that one or more of the child nodes cannot lock the session and, if so, the processing node at a block 1414 returns a NO to the block 720 or to the block 1020, as appropriate.

If the processing node is not the coordinator node, the processing node at a block 1416 sends an invoke lock message to its coordinator node which causes the coordinator node to invoke the lock routine of FIG. 25 for the session. The coordinator node, therefore, executes the lock routine of FIG. 25. The processing node determines at a block 1418 whether the coordinator node propagates a NO indicating that the coordinator node cannot lock the session and, if so, the processing node at a block 1420 returns a NO to the block 720 or to the block 1020, as appropriate.

If the lock routine was not invoked locally, the processing node at a block 1422 pushes a received invoke lock message to its child nodes which causes the child nodes to invoke the lock routine of FIG. 25 for the session. The child nodes, therefore, execute the lock routine of FIG. 25. The processing node determines at a block 1424 whether the child nodes returned a NO indicating that one or more of the child nodes cannot lock the session and, if so, the processing node at a block 1426 returns a NO to the block 720 or to the block 1020, as appropriate.

After the processing node returns a NO at the blocks 1402, 1414, 1420, or 1426, or if the processing node determines at the blocks 1412, 1418, or 1424 that a NO is not returned or propagated to the processing node, program flow returns to the block 720 or to the block 1020, as appropriate.

Figure 26:
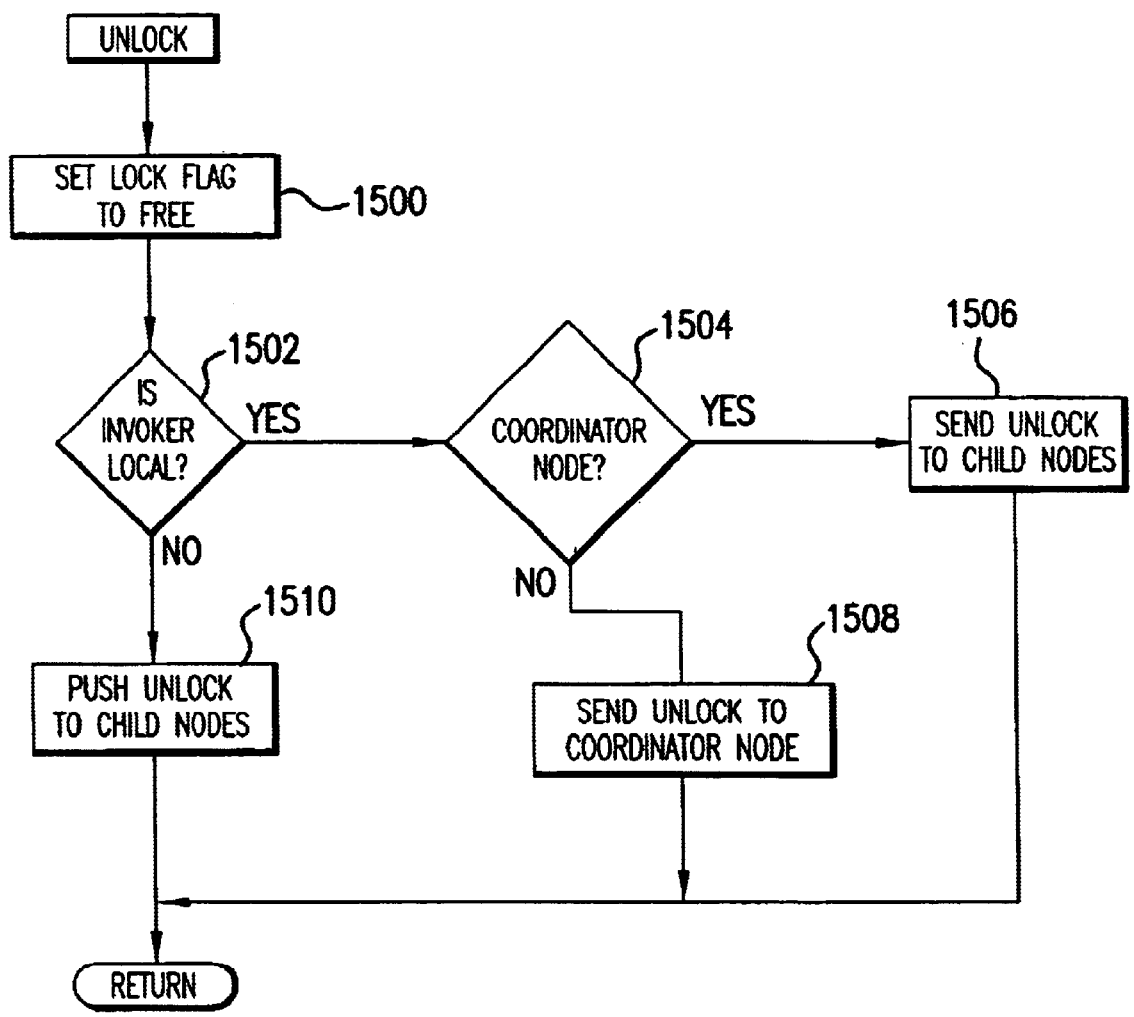

The unlock routine is invoked at the blocks 724 and 1024, and is shown in FIG. 26. At a block 1500, the processing node sets the LOCK flags of all previously locked sessions to FREE. At a block 1502, the processing node determines whether it invoked the unlock routine itself or whether it received an invoke unlock message from another processing node. If the unlock routine was invoked locally, the processing node determines at a block 1504 whether it is the coordinator node for the scheduling spanning tree of the arriving session. If the processing node is the coordinator node, the processing node at a block 1506 sends an invoke unlock message to its child nodes which causes the child nodes to invoke the unlock routine of FIG. 26 for the sessions being unlocked. If the processing node is not the coordinator node, the processing node at a block 1508 sends an invoke unlock message to its coordinator node which causes the coordinator node to invoke the unlock routine of FIG. 26. If the unlock routine was not invoked locally as determined at the block 1502, the processing node at a block 1510 pushes a received invoke unlock message to its child nodes which causes the child nodes to invoke the unlock routine of FIG. 26. After the processing node at the blocks 1506 or 1510 sends or pushes an invoke unlock message to its child nodes, or after the processing node at the block 1508 sends an invoke unlock message to its coordinator node, program flow returns to the block 726 or to he block 1026, as appropriate.

Figure 27:
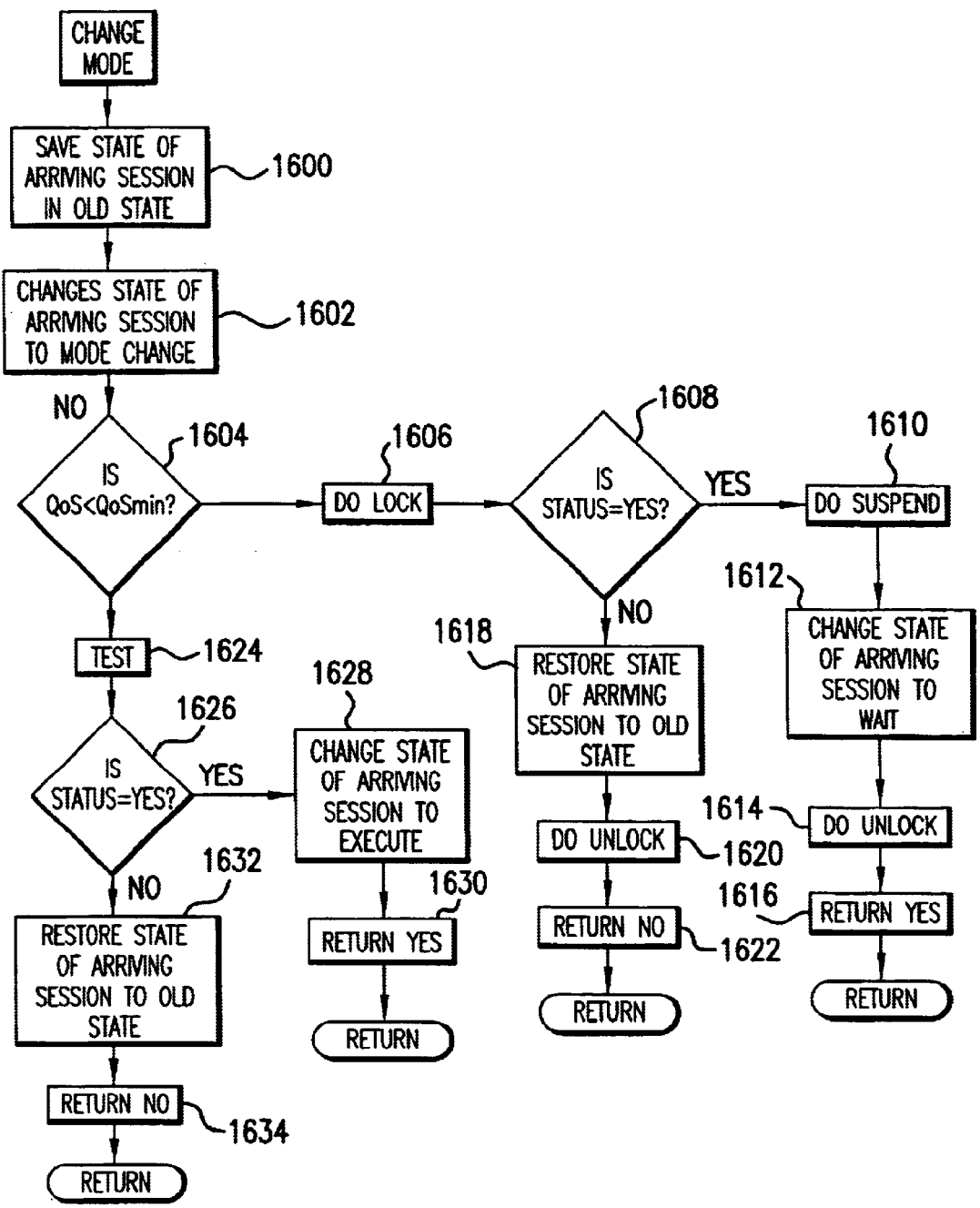

The change mode routine is invoked at the block 1316, and is shown in FIG. 27. At a block 1600, the processing node saves the current state of a session from the session admit list SA in an old state buffer in case the session is not permitted to change states, in which case the session is restored to its old state. At a block 1602, the iv processing node changes the state of the session to the MODE CHANGE state. The processing node at a block 1604 determines whether the QoS of the session is less than a minimum QoS. This minimum QoS may be zero, for example. If the QoS of the session is less than a minimum QoS, the session cannot be admitted for execution because its QoS cannot be further reduced in an effort to bring the session's resource requirements within the available resources of the processing node. Accordingly, the processing node at a block 1606 invokes the lock routine of FIG. 25 in order to attempt to lock the session, and determines at a block 1608 whether the lock routine has returned a YES, indicating that the session is successfully locked.

If the lock routine returns a YES (i.e., the session is locked), the processing node at a block 1610 invokes the suspend routine which is described below in connection with FIG. 28, and the processing node at a block 1612 changes to the state of the session to the WAIT state. At a block 1614, the processing node invokes the unlock routine of FIG. 26 and, at a block 1616, the processing node returns a YES to the block 1314.

If the lock routine returns a NO (indicating that the session cannot be locked), the processing node at a block 1618 restores the session to its old state. At a block 1620, the processing node invokes the unlock routine of FIG. 26 and, at a block 1622, the processing node returns a NO to the block 1314.

If the processing node at the block 1604 determines that the QoS of the session is not less, than a minimum QoS, the processing node at a block 1624 conducts a test, such as a test according to the criteria established at the equations (7), (8), (10), (12), and (13), in order to determine if the readmission of the session with its QoS set at a minimum will cause the resources of the processing node to be exceeded. If the processing node at a block 1626 determines that the test conducted at the block 1624 returns a YES (i.e., the session can be readmitted without exceeding the available resources of the processing node), the processing node at a block 1628 changes to the state of the session to the EXECUTE state so that the session can now be executed. At a block 1630, the processing node returns a YES to the block 1314.

If the processing node at a block 1626 determines that the test conducted at the block 1624 returns a NO (i.e., the session cannot be readmitted without exceeding the available resources of the processing node), the processing node at a block 1632 restores the session to its old state, and the processing node at a block 1634 returns a NO to the block 1314. The No's and Yes's returned by the blocks 1616, 1622, 1630, and 1634 are primarily for the benefit of the application user who, if the return is No, may want to take another action.

Figure 28:
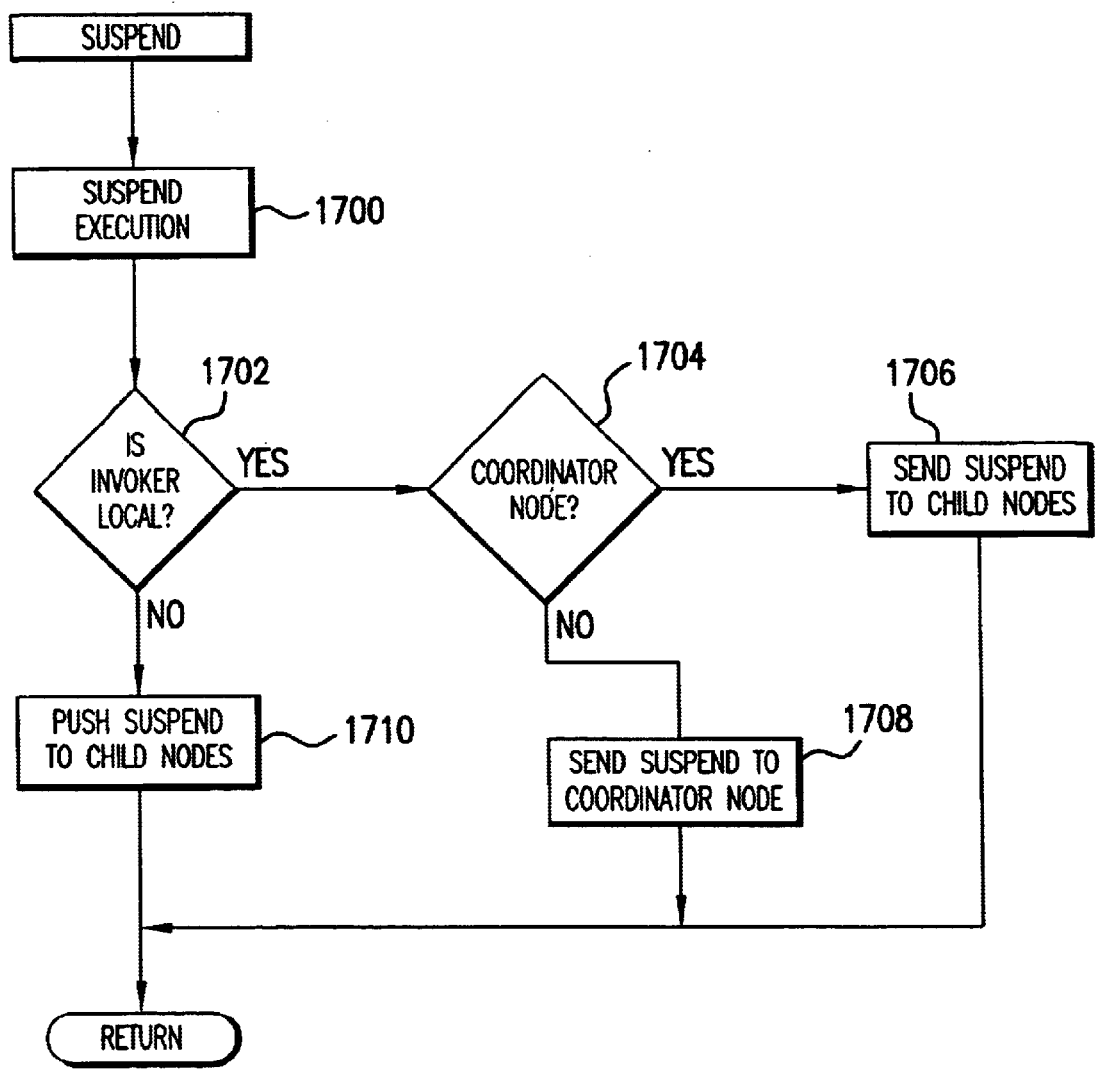

The suspend routine is invoked at the block 1610, and is shown in FIG. 28, At a block 1700, the processing node suspends execution of the session. At a block 1702, the processing node determines whether it invoked the suspend routine itself or whether it received an invoke suspend message from another processing node. If the suspend routine was invoked locally, the processing node determines at a block 1704 whether it is the coordinator node for the scheduling spanning tree of the arriving session. If the processing node is the coordinator node, the processing node at a block 1706 sends an invoke suspend message to its child nodes which causes the child nodes to invoke the suspend routine of FIG. 28. If the processing node is not the coordinator node, the processing node at a block 1708 sends an invoke suspend message to its coordinator node which causes the coordinator node to invoke the suspend routine of FIG. 28 and to propagate the invoke suspend message to its child nodes. If the suspend routine was not invoked locally as determined at the block 1702, the processing node at a block 1710 pushes a received invoke suspend message to its child nodes which causes the child nodes to invoke the suspend routine of FIG. 28. After the processing node at the blocks 1706 or 1710 sends or pushes an invoke suspend message to its child nodes, or after the processing node at the block 1708 sends an invoke suspend message to its coordinator node, program flow returns to the block 1612.

The process described above in connection with FIGS. 9–28 may be characterized as a global QoS negotiation and adaptation process because the global resource managers of the processing nodes defining a scheduling spanning tree negotiate with one another for a QoS range that is supportable by all of the processing nodes of the scheduling spanning tree and because the coordinator node of the scheduling spanning tree adapts the QoS in the commit message to substantially the highest QoS in this negotiated QoS range.

One of the advantages of the present invention is that the application user may select an initial rate and/or QoS on line and even a different criticality level within the range [0, $CLF_{max}$], and may thereafter select a different rate and/or QoS on line and even a different criticality level within the range [0, $CLF_{max}$]. Thus, for example, if an application user's application is preempted, the application user may change the specified timing and/or QoS in an effort to attempt to resume execution of the application.

The present invention also provides a means to enable the use of different types of resource schedulers/managers through a common set of programming interface instructions, such as the test-and-hold instruction, the commit instruction, and the abort instruction, and an adapter mechanism, if necessary. In the case of the CPU scheduler 16, for example, a processing node may use an Earliest-Deadline-First (EDF) based CPU scheduler instead of the RMA-based CPU scheduler discussed above. In this case, a system administrator simply replaces the $C_{max}$ value of ln2 ($\approx 0.69$) by a value of 1.0 for the equation (8). The global resource manager 14 interacts with the EDF based CPU scheduler in the same way as with the RMA base CPU scheduler via the programming interface instructions.

In the case of the network resource scheduler 24, as another example, the present invention may use network admission controls other than the BCR based method described above. For example, the network resource manager 24 may operate according to (i) an RSVP network admission protocol disclosed by Zhang, Deering, Estrin, Shenker, and Zappala in "RSVP: A New Resource ReSer-Vation Protocol," IEEE Network, 1993, (ii) an ST-II network admission protocol disclosed by Topolcic in "Experimental Internet Stream Protocol," Internet RFC 1190, 1990, (iii) or the like. In particular, the RSVP network admission protocol is a receiver oriented reservation protocol in which the receiver (of data) initiates the reservation protocol. However, the control flow direction in the global resource manager 14 is determined by the location of the coordinator node in the scheduling spanning tree, and can either be the same as, or different from, the data flow direction of the application. An adapter may be provided for the network resource manager 26 which adapts to these two flow directions, i.e., control flow and data flow in the same direction, and control flow and data flow in different directions. If the control flow directions different from the data flow direction so that the parent node in the scheduling spanning tree is the data receiver, the RSVP network admission protocol fits the ripple scheduling protocol described in connection with FIGS. 9–28, because the RSVP reservation message can be issued from the parent node. However, if the control flow direction is the same as the data flow direction so that a child node is the data receiver, the RSVP network admission protocol should be initiated by the child node. Initiation of the RSVP network admission protocol is carried out by delaying the parent node's network reservation until the child node replies in the first phase (i.e., the test-and-hold phase) of ripple scheduling.

Thus, the message flow in the case where the control flow direction and the data flow direction are the same is as follows:
1. GRMI→AdapterI: NRM_TestAndHold
2. AdapterI: rapi_sender
3. AdapterI→AdapterT: NRM_msg(reserve)
4. AdapterT: rapi_reserve
5. AdapterT→AdapterI: status of "NRM_msg(reserve)" =OK/Not_OK
6. AdapterI→GRMI: YES/No In the above message flow, node I is the initiator node (i.e., a parent node which is to transmit data) and node T is the target node (i.e., a child node which is to receive the data). Thus, the global resource manager 14 of node I first instructs its corresponding adapter to initiate a network test-and-hold operation to determine if the network can support the required network bandwidth. Second, the adapter of node I invokes the RSVP protocol as the sender node to determine if node I can support the required network bandwidth for the transmission of data. Third, if node I can support the required network bandwidth, the adapter of node I causes an RSVP reserve command message to be sent to the adapter of node T asking whether node T can support the required network bandwidth. Fourth, the adapter of node T invokes the RSVP protocol to determine if node T can support the required network bandwidth. Fifth, the adapter of node T causes an NRM message equal to OK to be sent to the adapter of node I if node T can support the required network bandwidth, or the adapter of node T causes an NRM message equal to Not_OK to be sent to the adapter of node I if node T cannot support the required network, bandwidth. Sixth, the adapter of node I passes the OK (Yes) or Not_OK (No) response to its corresponding global resource manager 14.

On the other hand, the message flow in the case where the control flow direction and the data flow direction are different is as follows:
1. GRMI→AdapterI: NRM_TestAndHold
2. AdapterI→AdapterT: NRM_msg(send)
3. AdapterT: rapi_sender
4. AdapterT→AdapterI: status of "NRM_msg(send)"= OK/NotOK
5. AdapterI: rapi_reserve
6. AdapterI→GRMI: YES/No In the above message flow, node I is the initiator node (i.e., a parent node which is to receive data) and node T is the target node (i.e., a child node which is to transmit the data). Thus, the global resource manager 14 of node I first instructs its corresponding adapter to initiate a network test-and-hold operation to determine if the network can support the required network bandwidth. Second, the adapter of node I causes an RSVP send command message to be sent to the adapter of node T asking node T to send data. Third, the adapter of node T invokes the RSVP protocol as the sender node to determine if node T can support the required network bandwidth for the transmission of the data. Fourth, the adapter of node T causes an NRM message equal to OK to be sent to the adapter of node I if node T can support the required network bandwidth, or the adapter of node T causes an NRM message equal to Not_OK to be sent to the adapter of node I if node T cannot support the required network bandwidth. If the message is Not_OK, steps five and six are unnecessary and are not executed. However, if the message is OK, steps five and six are executed. Therefore, fifth, if the message is OK, the adapter of node I invokes the RSVP protocol to determine if node I can support the required network bandwidth. Sixth, the adapter of node I passes a Yes response to its corresponding global resource manager 14 if node I can support the required network bandwidth, or the adapter of node I passes a No response to its corresponding global resource manager 14 if node I cannot support the required network bandwidth.

Certain modifications of the present invention have been discussed above. Other modifications will occur to those practicing in the art of the present invention. For example, as described above, the processing node $12_i$ includes the CPU scheduler 16, the disk I/O scheduler 18, the buffer manager 20, the window/video manager 22, and the network resource manager 24 which schedule access to a CPU resource, a disk I/O resource, a buffer memory resource, a window/video processing resource, and network bandwidth respectively. However, the processing node $12_i$ may include apparatus other than, or in addition to, the CPU scheduler 16, the disk I/O scheduler 18, the buffer manager 20, the window/video manager 22, and the network resource manager 24 for scheduling access to resources other than, or in addition to, a CPU resource, a disk I/O resource, a buffer memory resource, a window/video processing resource, and network bandwidth.

Also, the tests as described above may be conducted in relation to the applicable resource constraints, such as the resource constraints established by the equations (7), (8), (10), (12), and (13). However, these tests may be conducted according to other applicable resource constraints, not necessarily the resource constraints criteria established by the equations (7), (8), (10), (12), and (13).

In addition, the present invention has been described in connection with mission-critical continuous multimedia applications. However, the present invention may be useful with other types of applications.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A global resource manager for communicating locally with a local resource manager that locally manages an application session and for communicating globally with another global resource manager in order to globally manage the application session, wherein the global resource manager globally manages the application session according to a criticality level, a timing requirement, and a QoS of the session.

2. The global resource manager of claim 1 wherein the global resource manager is arranged to cause the shrinking of a QoS of the application session and of at least some concurrent sessions.

3. The global resource manager of claim 2 wherein the global resource manager is arranged to preempt the application session, if necessary.

4. The global resource manager of claim 3 wherein the global resource manager is arranged to cause the expansion of the QoS of the application session and of at least some of the concurrent sessions.

5. The global resource manager of claim 1 wherein the timing requirement comprises rate and latency requirements.

6. The global resource manager of claim 1 wherein the global resource manager is arranged to permit an application user to re-specify the criticality level for the application session after execution of the application session has started.

7. The global resource manager of claim 1 wherein the global resource manager is arranged to permit an application user to re-specify the timing requirement for the application session after execution of the application session has started.

8. The global resource manager of claim 1 wherein the global resource manager is arranged to permit an application user to re-specify a QoS for the application session after execution of the application session has started.

9. The global resource manager of claim 1 wherein the global resource manager is arranged to implement QoS shrinking, session preemption, and QoS expansion of concurrent sessions in order to determine whether to admit an arriving session.

10. The global resource manager of claim 1 wherein the global resource manager preempts the application session according to the criticality level of the session.

11. The global resource manager of claim 1 wherein the global resource manager admits the application session according to the criticality level of the session.

12. A processing node of a distributed data processing system comprising:
 a local resource manager arranged to manage a local resource in response to a test-and-hold instruction; and,
 a global resource manager, wherein the global resource manager is arranged to conduct a peer-to-peer global QoS negotiation and adaptation with other global resource managers of the distributed data processing system through a test-and-hold instruction, wherein the global resource manager is arranged to initiate a test-and-hold instruction to the local resource manager, wherein the global resource manager is arranged to receive a response from the local resource manager indicating whether its local resource can support a session, and wherein the global resource manager is arranged to interface with different types of local resource managers.

13. The processing node of claim 12 wherein the global resource manager is arranged to send a commit message to another global resource manager if the response from the local resource manager indicates that the local resource can support the session.

14. The processing node of claim 12 wherein the global resource manager is arranged to send an abort message to another global resource manager if the response from the local resource manager indicates that the local resource cannot support the session.

15. A processing node of a distributed data processing system comprising:
 a local resource manager arranged to manage a local resource in response to a test-and-hold instruction;
 an operating system, wherein the operating system is arranged to operate the local resource; and,
 a global resource manager, wherein the global resource manager is arranged to conduct a peer-to-peer global negotiation with other global resource managers of the distributed data processing system through a test-and-hold instruction, wherein the global resource manager is arranged to initiate a test-and-hold instruction to the local resource manager, wherein the global resource manager is arranged to receive a response from the local resource manager indicating whether its local resource can support a session, and wherein the global resource manager sits on top of the operating system.

16. The processing node of claim 15 wherein the global resource manager comprises:
 QoS shrinking means for shrinking a QoS of each of a plurality of executing sessions and a QoS of an arriving session;
 preempting means for preempting, as necessary, the executing sessions which have criticality levels that are lower than a criticality level of the arriving session; and, QoS expanding means for expanding the QoS of any sessions.

17. The processing node of claim 16 wherein the QoS shrinking means shrinks the QoS of each of the executing sessions and shrinks the QoS of the arriving session to corresponding minimums.

18. The processing node of claim 16 wherein the preempting means includes determining means for determining a schedulable criticality level with respect to the executing sessions.

19. The processing node of claim 18 wherein the QoS expanding means expands the QoS of each session to a maximum QoS supportable by the local resource.

20. The processing node of claim 16 wherein the QoS expanding means expands the QoS of each session to a maximum QoS supportable by the local resource.

21. A method of globally managing a plurality of sessions executing at a plurality of distributed processing nodes comprising:

determining whether a local resource can support an arriving session by shrinking a QoS for each of the executing sessions and preempting one or more of the executing sessions, as necessary, to admit the arriving session; and, if it is determined that the local resource can support the arriving session, sending a message to the distributed processing nodes indicating that the local resource can support the arriving session.

22. The method of claim 21 wherein the message includes a QoS supportable by the local resource.

23. The method of claim 21 further comprising expanding the QoS of each executing session following QoS expansion and possible preemption.

24. The method of claim 21 further comprising transmitting an abort message if the arriving session cannot be supported.

25. The method of claim 21 wherein only those executing sessions having a lower criticality than a criticality of the arriving session are preempted if necessary.

* * * * *